(12) United States Patent
Kim et al.

(10) Patent No.: US 9,705,828 B2
(45) Date of Patent: Jul. 11, 2017

(54) MOBILE TERMINAL AND CONTROLLING METHOD THEREOF

(71) Applicant: LG ELECTRONICS INC., Seoul (KR)

(72) Inventors: Samsick Kim, Seoul (KR); Sesook Oh, Seoul (KR); Jongin Lim, Seoul (KR); Kyunghye Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/990,595

(22) Filed: Jan. 7, 2016

(65) Prior Publication Data

US 2016/0205049 A1  Jul. 14, 2016

(30) Foreign Application Priority Data

Jan. 8, 2015 (KR) .......... 10-2015-0002829

(51) Int. Cl.

| | |
|---|---|
| *H04L 12/58* | (2006.01) |
| *G06F 3/0484* | (2013.01) |
| *G10L 15/26* | (2006.01) |
| *G06F 3/16* | (2006.01) |
| *G06F 3/0488* | (2013.01) |
| *G06F 3/0482* | (2013.01) |
| *G06F 3/0485* | (2013.01) |

(52) U.S. Cl.
CPC .......... *H04L 51/046* (2013.01); *G06F 3/0482* (2013.01); *G06F 3/0485* (2013.01); *G06F 3/04842* (2013.01); *G06F 3/04845* (2013.01); *G06F 3/04883* (2013.01); *H04L 51/16* (2013.01); *G06F 3/167* (2013.01); *G10L 15/26* (2013.01)

(58) Field of Classification Search
CPC ....... H04L 51/046; H04L 51/16; H04L 51/12; G06F 3/04883; G06F 3/0482; G06F 3/04845; G06F 3/0485; G06F 3/04842; G06F 3/167; G10L 15/26
See application file for complete search history.

(56) References Cited

U.S. PATENT DOCUMENTS

| | | | | |
|---|---|---|---|---|
| 2005/0144247 | A1* | 6/2005 | Christensen | ............ H04L 51/04 709/207 |
| 2007/0112571 | A1* | 5/2007 | Thirugnana | ..... H04M 1/274516 704/270 |
| 2014/0298210 | A1* | 10/2014 | Park | ...................... G06F 3/0486 715/758 |

* cited by examiner

*Primary Examiner* — Kashif Siddiqui
*Assistant Examiner* — Minjung Kim
(74) *Attorney, Agent, or Firm* — Birch, Stewart, Kolasch & Birch, LLP

(57) ABSTRACT

A mobile terminal including a touchscreen; a wireless communication unit; and a controller configured to display a group chat window on the touchscreen including a history of messages transceived via the wireless communication unit with a plurality of counterpart terminals, receive a selection of a prescribed counterpart terminal for transmitting a private message to the prescribed counterpart terminal, receive an input message in the group chat window for the prescribed counterpart terminal, and transmit the input message as the private message to the prescribed counterpart terminal without switching to an individual chat window with the prescribed counterpart terminal.

16 Claims, 41 Drawing Sheets

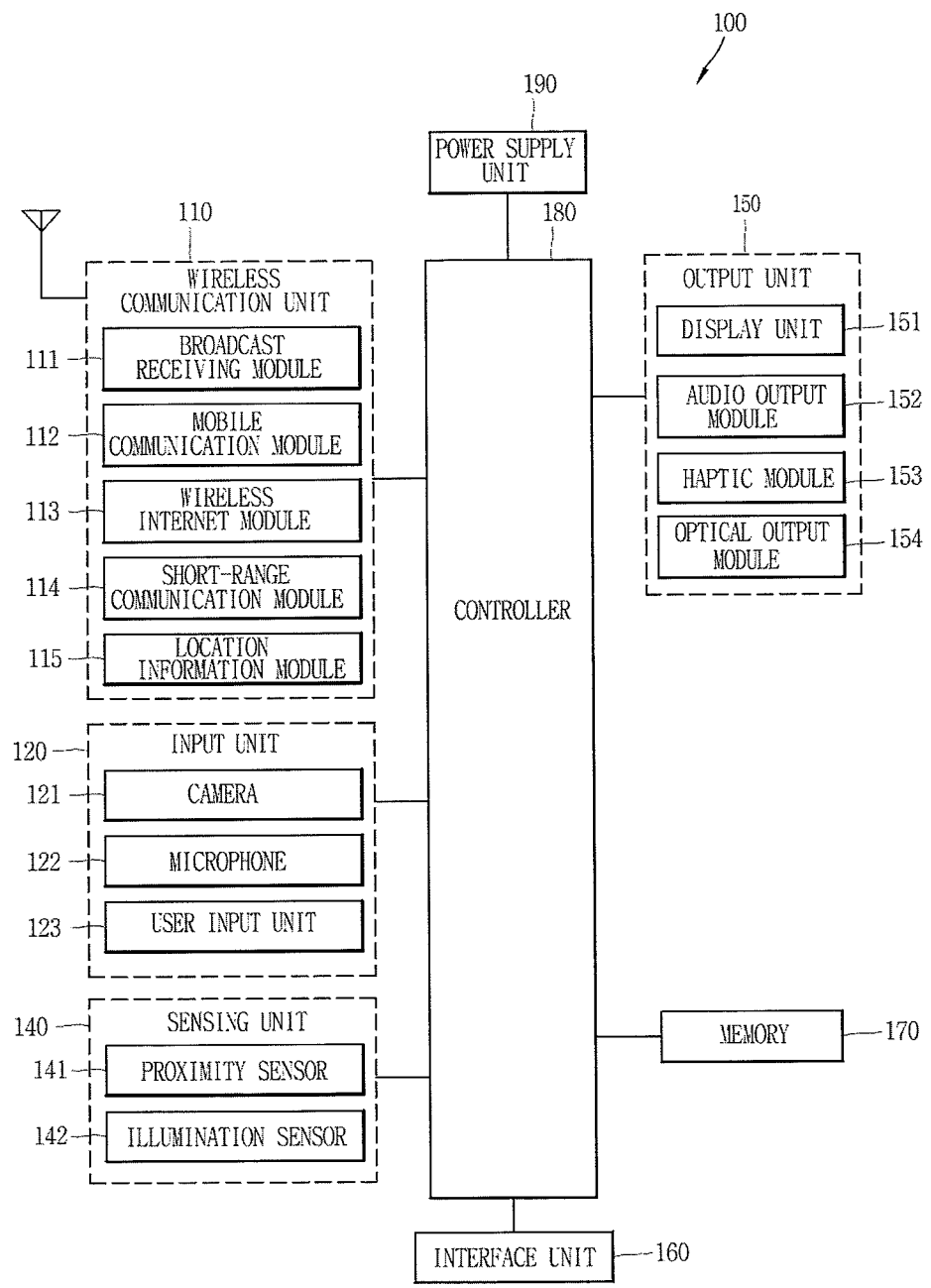

(a)
Kim's group chat window (b)
Lee's group chat window (a)
Kim's group chat window (b)
Individual chat window with Song (a) Kim's group chat window (b) Individual chat window with Song

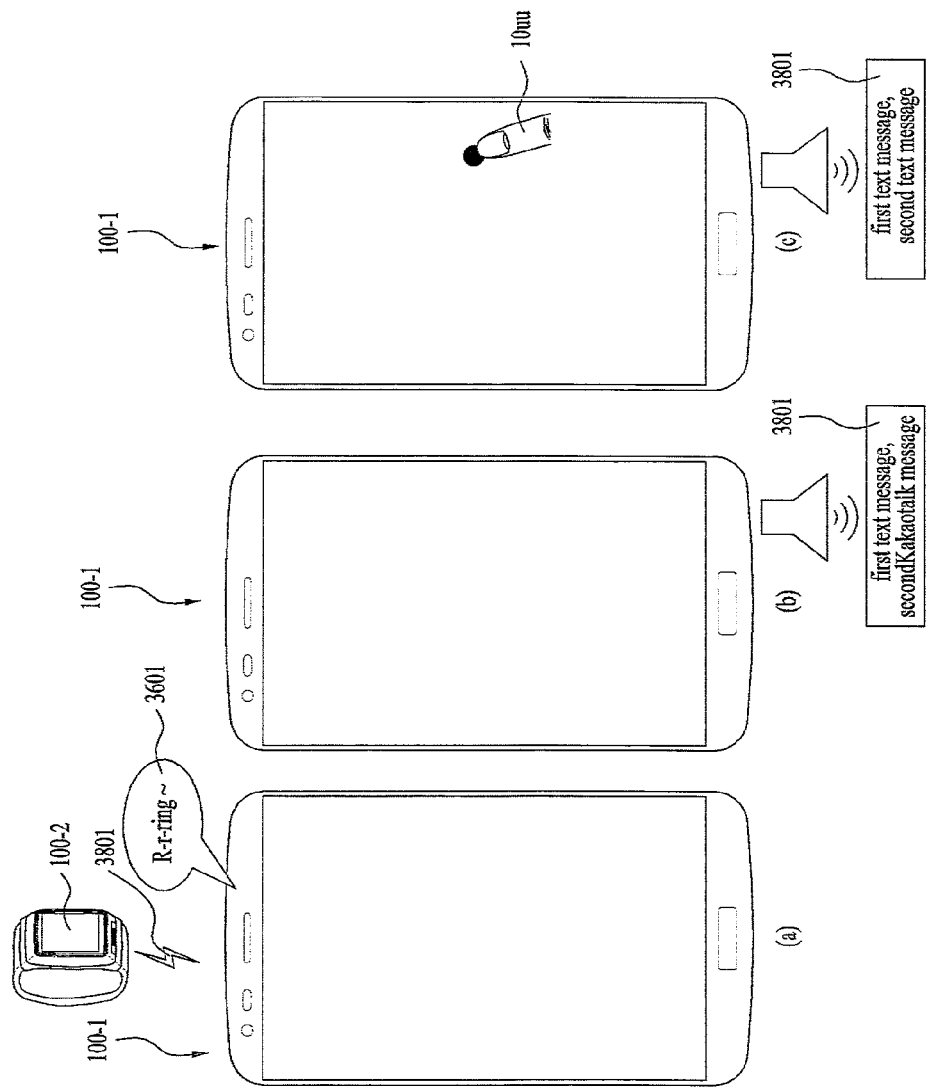

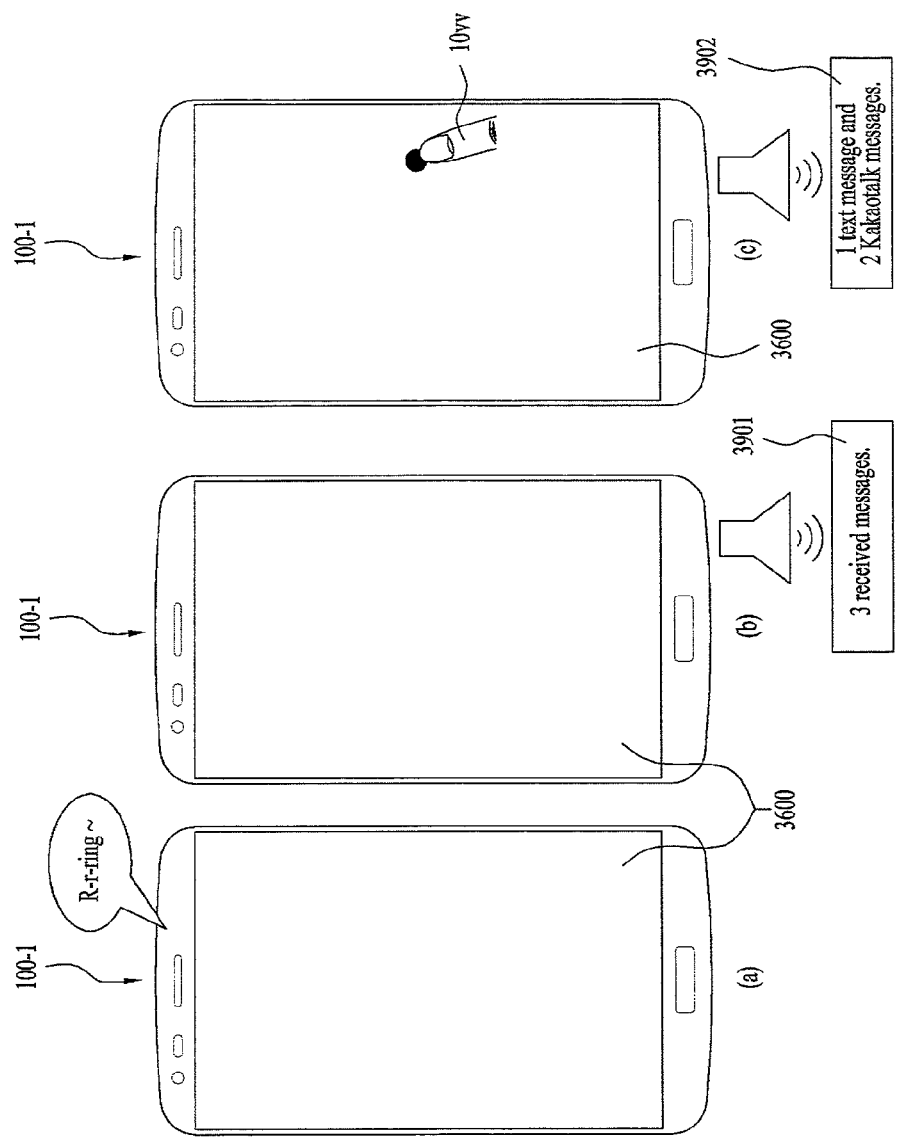

MOBILE TERMINAL AND CONTROLLING METHOD THEREOF

Pursuant to 35 U.S.C. §119(a), this application claims the benefit of earlier filing date and right of priority to Korean Application No. 10-2015-0002829, filed on Jan. 8, 2015, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for facilitating the use of a terminal in further consideration of user's convenience.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mounted terminals. There are ongoing efforts to support and increase the functionality of mobile terminals. Such efforts include software and hardware improvements, as well as changes and improvements in the structural components which form the mobile terminal.

Particularly, as a mobile terminal recently has the high computing power like a smartphone, a control method using a user's voice recognition tends to be increasingly utilized. In order to improve the accuracy of the user's voice recognition, a voice database is accessed and a matched voice data should be found. In order to perform such a process fast in real time, high computing power will be required for the performing device. Thus, the demands for a terminal for a control method of recognizing a user's voice accurately, obtaining user's accurate intention, and launching a function matching the obtained intention are increasingly rising.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which a message can be sent to a prescribed counterpart terminal on an application capable of transceiving messages.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to one embodiment of the present invention may include a touchscreen, a wireless communication unit configured to transceive a message with a counterpart terminal, and a controller controlling the touchscreen to output a group chat window including a history of messages transceived with a plurality of counterpart terminals, the controller, if a message is input through the output group chat window, sending the input message to a plurality of the counterpart terminals, the controller, if a message is input through the output group chat window when a prescribed counterpart terminal is selected from a plurality of the counterpart terminals, sending the input message to the selected prescribed counterpart terminal only without switching to an individual chat window with the prescribed counterpart terminal.

In another aspect of the present invention, as embodied and broadly described herein, a method of controlling a mobile terminal according to another embodiment of the present invention may include the steps of outputting a group chat window including a history of messages transceived with a plurality of counterpart terminals, receiving an input of a message through the output group chat window, and sending the input message to a plurality of the counterpart terminals, wherein in the input message sending step, if a message is input through the output group chat window when a prescribed counterpart terminal is selected from a plurality of the counterpart terminals, the input message is sent to the selected prescribed counterpart terminal only without switching to an individual chat window with the prescribed counterpart terminal.

It is to be understood that both the foregoing general description and the following detailed description of the preferred embodiments of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 1A is a block diagram of a mobile terminal in accordance with an embodiment of the present disclosure.

FIG. 38 is a diagram illustrating one example of reading a message in case of a success in user authentication according to one embodiment of the present invention; and FIG. 39 is a diagram illustrating one example of informing a user of message receptions in case of incompletion of user authentication according to one embodiment of the present invention.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like. By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
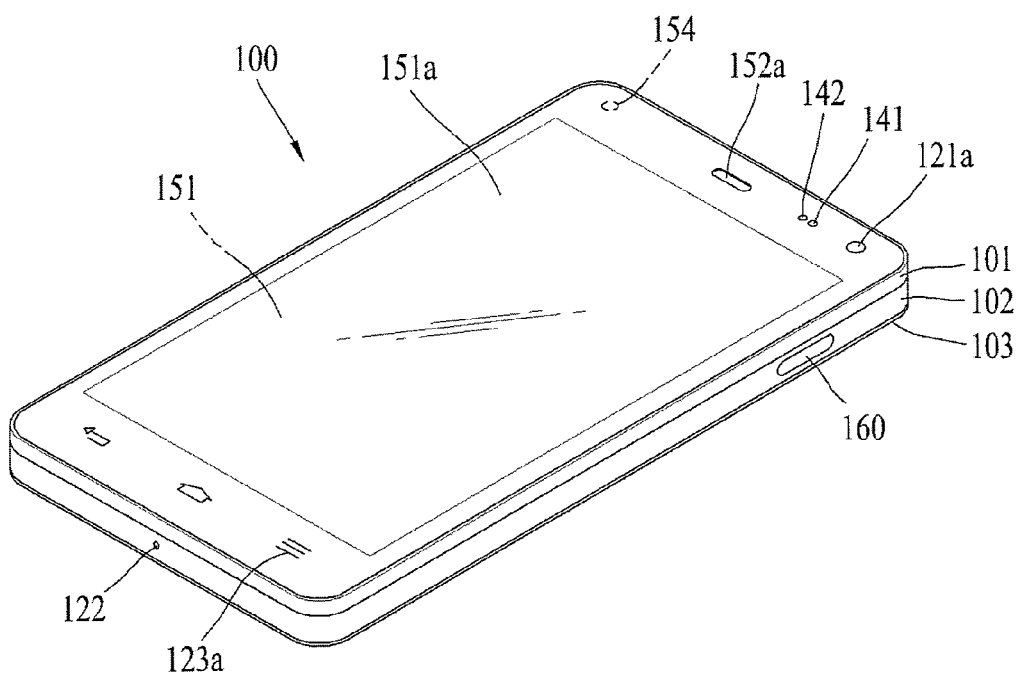
FIGS. 1B and 1C are conceptual views of one example of the mobile terminal, viewed from different directions.
Figure 1C:
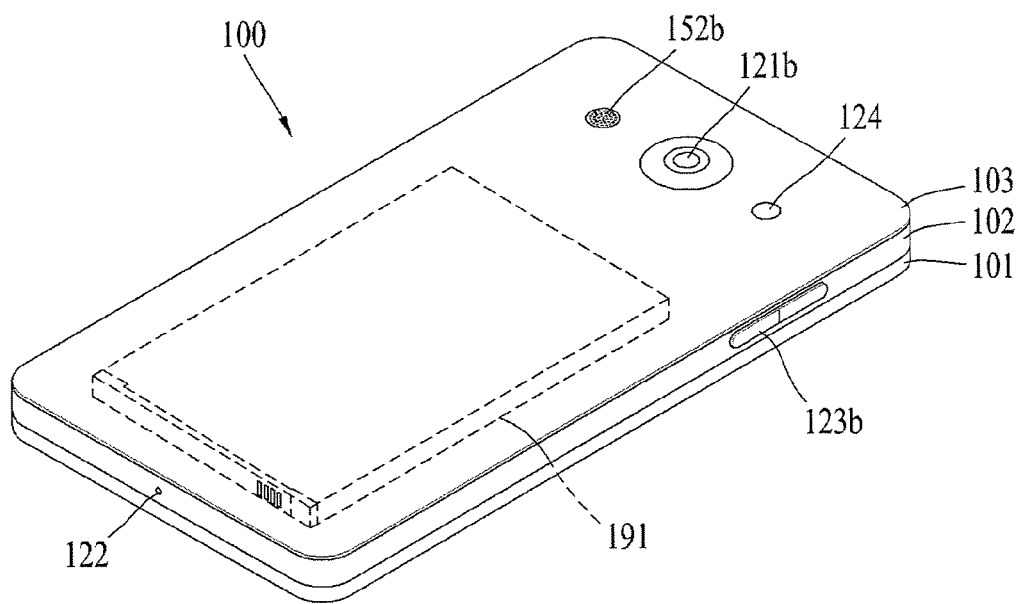

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115. The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, information and the like input or output through the above-mentioned components and/or executes application programs saved in the memory 170, thereby processing or providing a user with appropriate information and/or functions.

The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body. At least one portion of the respective components mentioned in the foregoing description can cooperatively operate to embody operations, controls or controlling methods of the mobile terminal according to various embodiments of the present invention mentioned in the following description. Moreover, the operations, controls or controlling methods of the mobile terminal can be embodied in the mobile terminal by executing at least one or more application programs saved in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division. Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages. The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated while receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like. If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information. In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like. The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (110) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen. The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition. The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging. The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b. The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled. The mobile terminal 100 may be provided with the display unit 151, the first audio output unit 152a, the second audio output unit 152b, the proximity sensor 141, the illumination sensor 142, the light output unit 154, the first camera 121a, the second camera 121b, the first manipulating unit 123a, the second manipulating unit 123b, the microphone 122, the interface unit 160, and the like.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces. The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170. The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123. The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102. An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Generally, a message transceiving application enables messages to be transceived among a plurality of terminals, thereby providing a group chat function for a plurality of users to have a group chat with each other simultaneously. For instance, when first to fifth terminals simultaneously have a group chat, a message sent by the first terminal can be received by each of the second to fifth terminals. Yet, in using the group chat function, it is disadvantageously inconvenient to switch to an individual chat. Therefore, according to one embodiment of the present invention, a control method of sending a message to an individual counterpart terminal easily while sending a group message to a plurality of counterpart terminals is provided. Such an embodiment is described in detail with reference to the accompanying drawings as follows.

Figure 2:
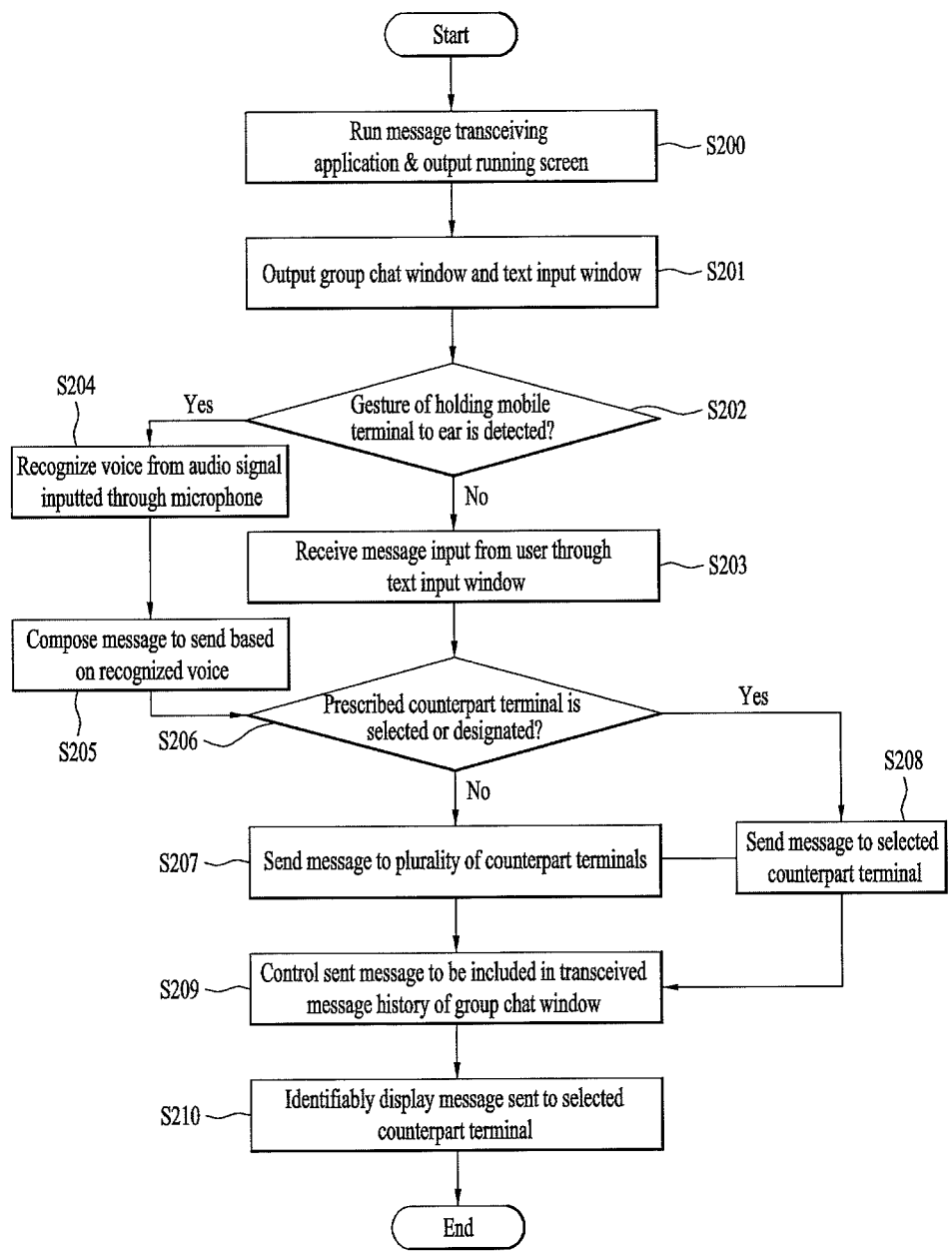
FIG. 2 is a flowchart illustrating a method of sending a message to a prescribed counterpart terminal individually while sending a message to a plurality of counterpart terminals according to one embodiment of the present invention.
Figure 3:
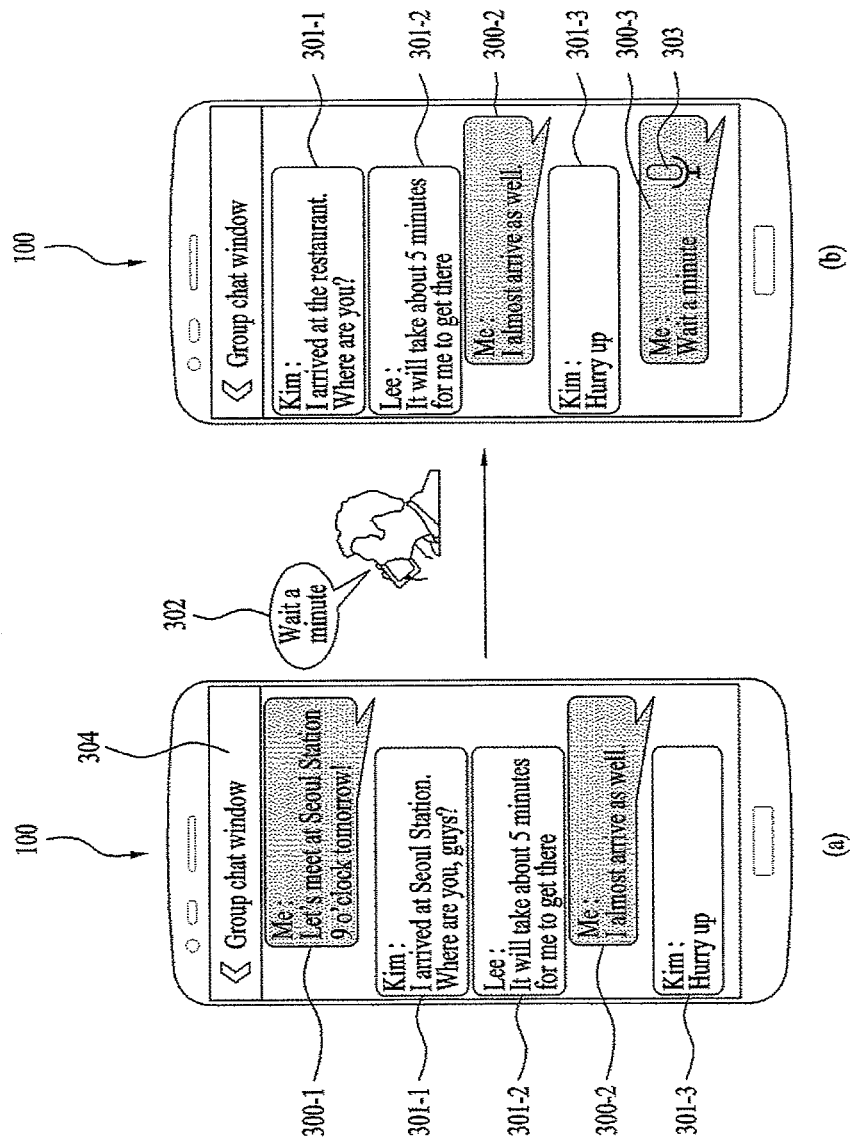
FIG. 3 is a diagram illustrating a control method of sending a message to a plurality of counterpart terminals according to one embodiment of the present invention.

In particular, FIG. 2 is a flowchart for a method of sending a message to a prescribed counterpart terminal individually while sending a message to a plurality of counterpart terminals according to one embodiment of the present invention. In addition, FIG. 3 is a diagram illustrating a control method of sending a message to a plurality of counterpart terminals according to one embodiment of the present invention. The following description will be made with reference to FIG. 2 and FIG. 3.

Referring to FIG. 2 and FIG. 3, in the step S200, the controller 180 executes a message transceiving application and outputs an execution screen of the message transceiving application. In the step S201, as shown in FIG. 3 (*a*), the controller 180 can output a group chat window and a text input window. In this instance, the group chat window corresponds to a screen for transceiving messages with a plurality of counterpart terminals and includes a history of messages transceived with a plurality of the counterpart terminals and a text input window for receiving an input of a message to be sent.

According to the example shown in FIG. 3, a user 'Song' of the mobile terminal 100, a first counterpart 'Kim' and a second counterpart 'Lee' are assumed as currently participating in the group chat function. Sent messages 300-1 and 300-2 and received messages 301-1 to 301-3 are output through the group chat window 304. Further, the sent messages and the received messages can be output by being distinguished from each other. For instance, referring to FIG. 3, the sent messages are displayed by being aligned on the right side of the chat window, while the received messages are displayed by being aligned on the left side of the chat window, by which the present embodiment is non-limited.

According to one embodiment of the present invention, in order to compose a message to send, a method of directly inputting a text through a typing input or a method of recognizing and inputting a user's voice through the microphone 122 is provided. Meanwhile, according to one embodiment of the present invention, the following process is provided. First of all, a gesture (hereinafter named an ear proximity gesture) applied in a manner that a user holds the mobile terminal 100 to a user's ear is detected (S202). Secondly, a user's voice is then recognized based on the detected gesture. In this instance, the ear proximity gesture can be determined based on various sensing results detected through the sensing unit 140.

By detecting a tilting of the mobile terminal 100 or a movement of the mobile terminal 100 in a specific direction using a gyroscopic sensor, an acceleration sensor and/or the like, it can determine that the ear proximity gesture is input. If it is detected that a specific object (e.g., a side surface of a user face, an ear of a user, etc.) approaches a front part of the mobile terminal 100, the controller 180 can determine that the ear proximity gesture is input. Meanwhile, a method of determining the ear proximity gesture is non-limited by the aforementioned example. Alternatively, the ear proximity gesture can be determined by the combination of the aforementioned example and other methods.

In the step S203, the controller 180 receives a text input by typing from a user through the output text input window. Alternatively, the controller 180 goes to the step S204, recognizes a voice from an audio signal input through the microphone 122, and then composes a message to send based on the recognized voice in the step S205.

In the step S206, the controller 180 determines whether a prescribed counterpart terminal is selected or designated from a plurality of the counterpart terminals currently participating in the group chat. If the prescribed counterpart terminal is designated, the controller 180 goes to the step S208. Otherwise, the controller 180 goes to the step S207. According to the embodiment related to FIG. 3, assume that the prescribed counterpart terminal is not selected.

While the group chat window 304 is displayed in FIG. 3 (*a*), if a user's voice 302 is recognized through the microphone 122, the controller 180 can send the recognized voice 302 to a plurality of the counterpart terminals all. In particular, the sent message 300-3 will be sent to a terminal (hereinafter named a counterpart terminal) of each counterpart currently participating in the group chat.

Referring to FIG. 3 (*b*), the sent message 300-3 may be included in a transceived message history (S209). Meanwhile, if the sent message 300-3 is input by a voice recognition, the controller 180 can further display a voice indicator 303, which is provided to indicate the input by the voice recognition, on the sent message 300-3.

Figure 4:
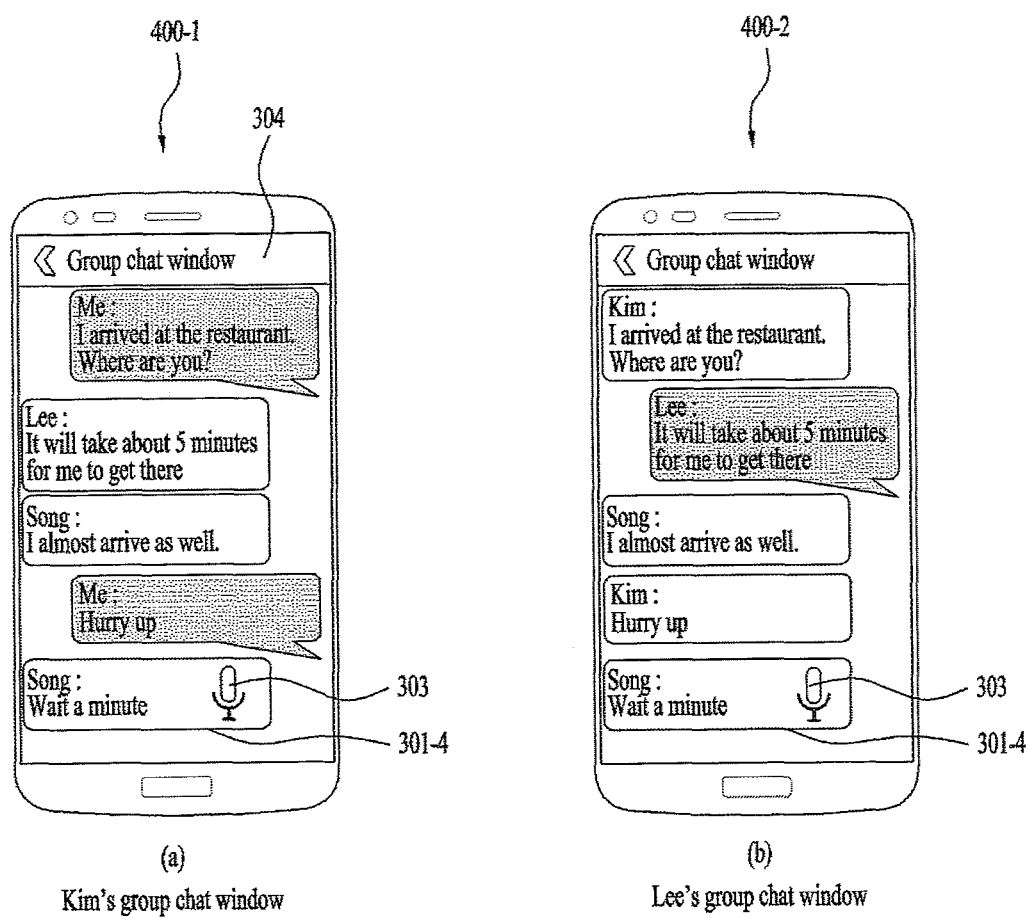
FIG. 4 is a diagram illustrating an execution configuration of a counterpart terminal having received a sent message 300-3 shown in FIG. 3 of according to one embodiment of the present invention.

FIG. 4 is a diagram illustrating an execution configuration of a counterpart terminal having received the sent message 300-3 shown in FIG. 3 of according to one embodiment of the present invention. In particular, FIG. 4 (*a*) shows a group chat window 304 of a terminal (hereinafter named a first counterpart terminal 400-1) of a first counterpart. Also, FIG. 4 (*b*) shows a group chat window 304 of a terminal (hereinafter named a second counterpart terminal 400-2) of a second counterpart.

Referring to FIG. 4 (*a*) and FIG. 4 (*b*), the sent message 300-3 shown in FIG. 3 is output as a received message 301-4 through each of the first counterpart terminal 400-1 and the second counterpart terminal 400-2. In particular, as mentioned in the foregoing description, the message composed through the group chat window 304 is sent to each of the first counterpart terminal 400-1 and the second counterpart terminal 400-2.

According to one embodiment of the present invention, a control method of sending a message to a specific counterpart terminal only through a simple touch gesture while executing (or outputting) the group chat window is provided. Such an embodiment is described in detail with reference to FIG. 2 (i.e., flowchart) and FIG. 5 as follows. A message sent to a specific counterpart only while executing a group chat function will be named a whisper message as in when the user whispers to another person in a group conversation.

Figure 5:
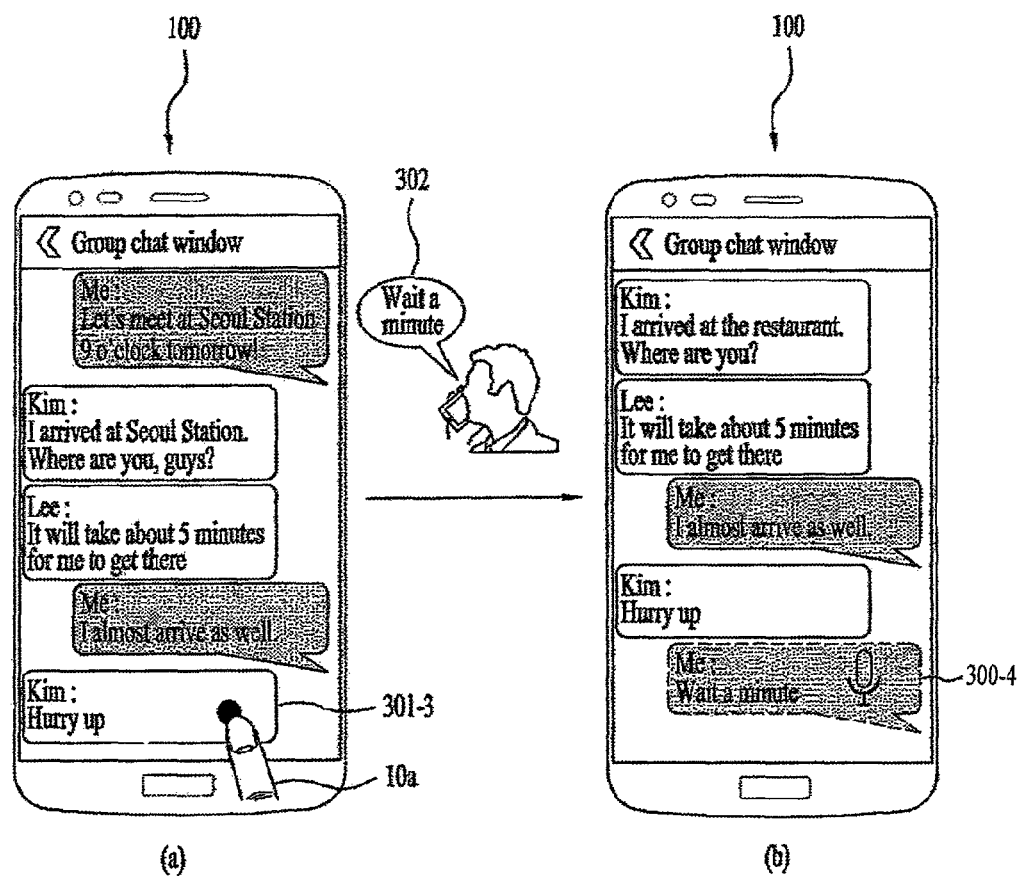
FIG. 5 is a diagram illustrating a control method of sending a whisper message to a specific counterpart easily while performing a group chat according to one embodiment of the present invention.

In particular, FIG. 5 is a diagram illustrating a control method of sending a whisper message to a specific counterpart easily while having a group chat according to one embodiment of the present invention. The following description is made together with the steps S206 to S210 shown in FIG. 2. First of all, in the step S206, the controller 180 determines whether a prescribed counterpart terminal is selected or designated from a plurality of the counterpart terminals currently participating in the group chat. If the prescribed counterpart terminal is designated, the controller 180 goes to the step S208. Otherwise, the controller 180 goes to the step S207.

Referring to FIG. 5 (*a*), the controller 180 receives a touch gesture 10*a* for selecting a prescribed counterpart terminal and also receives a voice input 302. According to one embodiment of the present invention, as the input for selecting the prescribed counterpart terminal, the input 10*a* of touching a received message 301-3 received from a counterpart terminal desired to be selected is provided. When a user intends to send a whisper message, the user can send the whisper message easily and conveniently by inputting a voice only while touching a specific counterpart in a group chat room. Thus, the user can send a private message to the specific counterpart.

In particular, when the voice is input from the user using the aforementioned ear proximity gesture, if the ear proximity gesture is input while a specific counterpart is touched, the controller 180 can send a message (e.g., a whisper message) to the specific counterpart only (e.g., a private message). Particularly, for the voice input, a start point of the voice input and an end point of the voice input are specified. Thus, for the touch input 10*a*, the start and end points of the touch can be easily set to the start and end points of the voice input, respectively.

In the step S208, the controller 180 sends the message (i.e., the whisper message) composed in the step S205 or input in the step S203 to the selected counterpart terminal only. Likewise, referring to FIG. 5 (*b*), the whisper message 300-4 can be included in the transceived message history (S209). Further, the whisper message sent to the specific counterpart terminal only can be displayed by being distinguished from other messages (e.g., displayed as a dotted word balloon shown in FIG. 5 (*b*)) and the specific counterpart terminal can be displayed together (Me→Kim).

Figure 6:
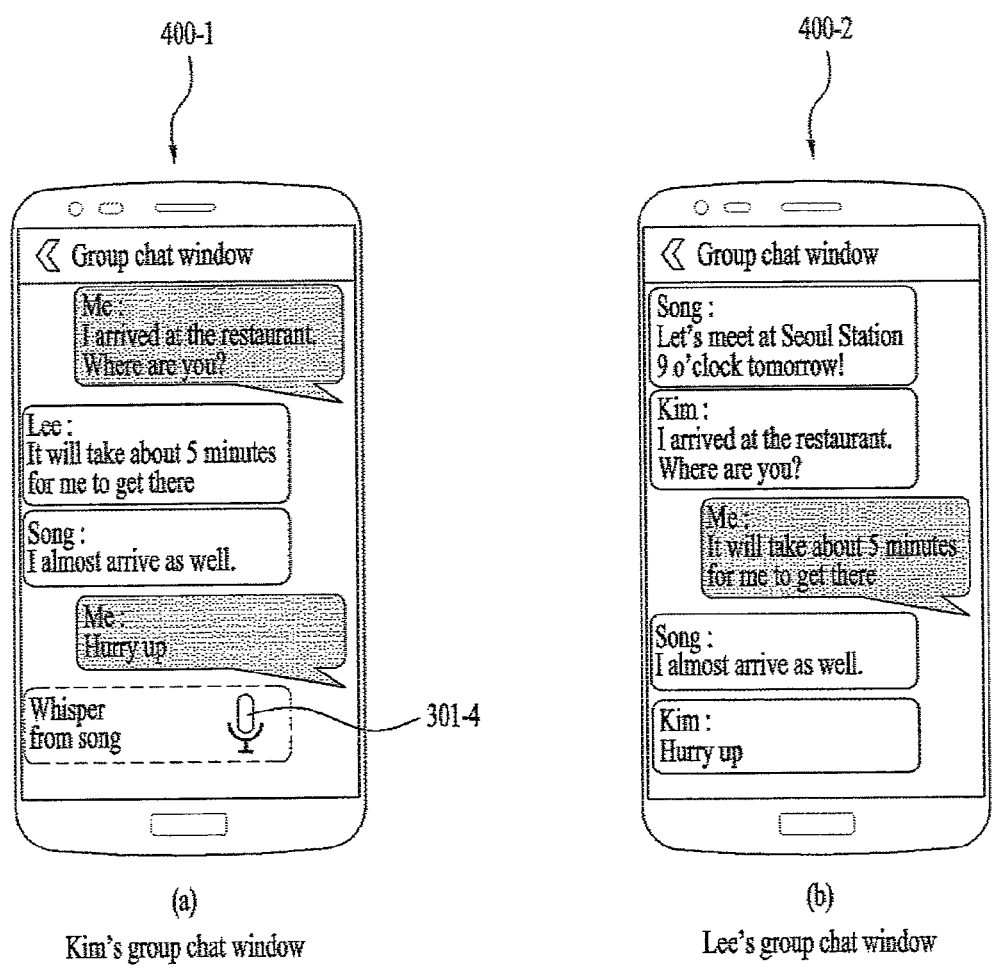
FIG. 6 is a diagram illustrating a configuration of a prescribed counterpart terminal having received a whisper message sent to the prescribed counterpart terminal only according to one embodiment of the present invention.

FIG. 6 is a diagram illustrating a configuration of a prescribed counterpart terminal having received a whisper message sent to the prescribed counterpart terminal only according to one embodiment of the present invention. In particular, FIG. 6 (*a*) shows a group chat window of a first counterpart terminal 400-1. In addition, FIG. 4 (*b*) shows a group chat window of a second counterpart terminal 400-2. The sent whisper message 300-4 shown in FIG. 5 is assumed to be sent to the first counterpart terminal 400-1 only.

Referring to the group chat windows shown in FIG. 6 (*a*) and FIG. 6 (*b*), the sent message 300-4 shown in FIG. 5 is output from the first counterpart terminal 400-1 only and is not output from the second counterpart terminal 400-2. Namely, as mentioned in the foregoing description, although the message is composed through the group chat window 304, it is sent to the first counterpart terminal 400-1 only.

Further, referring to FIG. 6 (*a*), the message content of the whisper message 400-1 output through the first counterpart terminal 400-1 may not be output in direct. One example of reading the whisper message 400-1 according to one embodiment of the present invention is described in detail with reference to FIG. 7 as follows.

Figure 7:
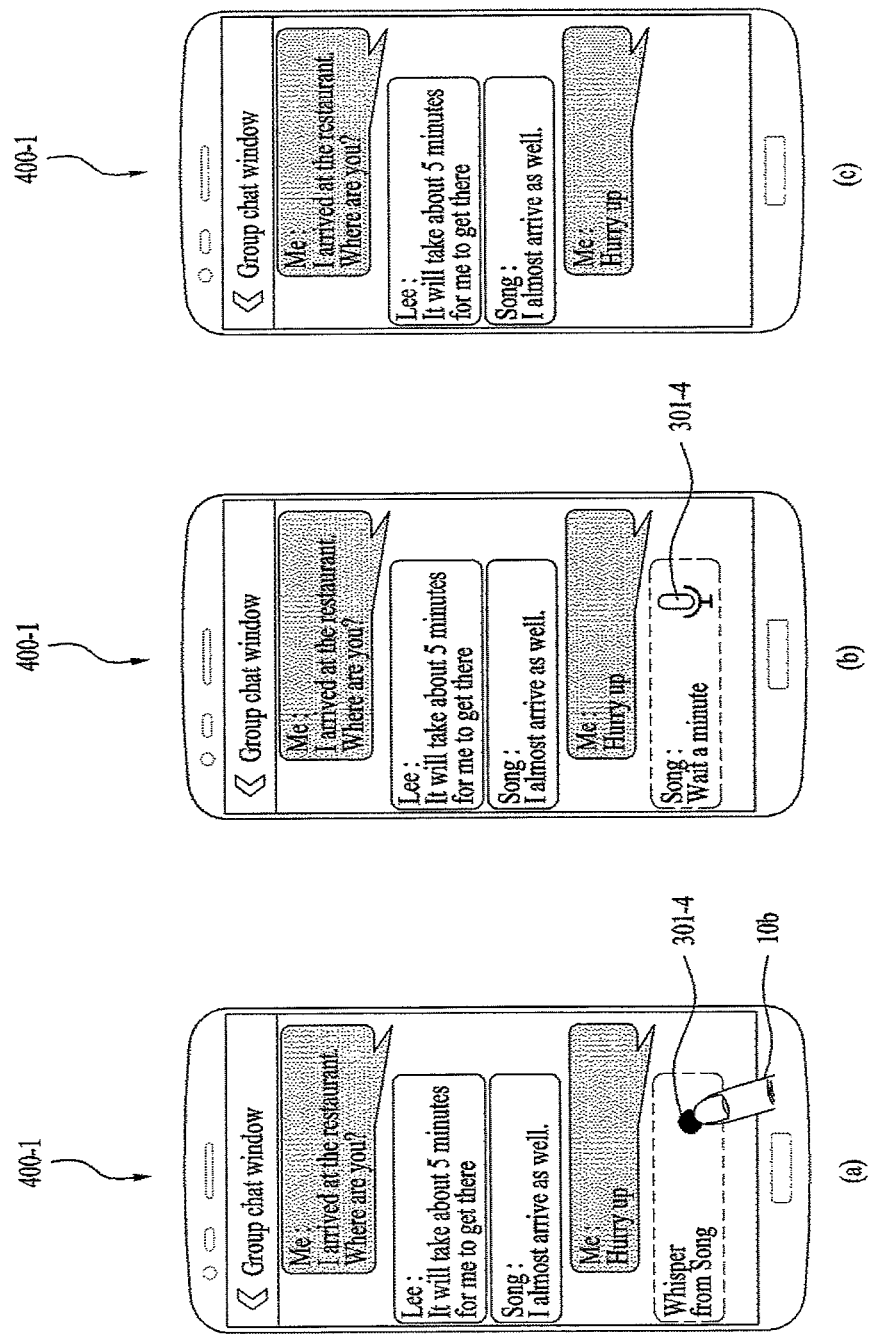
FIG. 7 is a diagram illustrating one example of outputting a content of a whisper message according to one embodiment of the present invention.

FIG. 7 is a diagram illustrating one example of outputting a content of a whisper message according to one embodiment of the present invention. In particular, FIGS. 7 (*a*) to 7 (*c*) are configuration diagrams of the first counterpart terminal 400-1 having received the whisper message 301-4. Referring to FIG. 7 (*a*), if an input 10*b* for selecting the whisper message 301-4 is received, the controller 180 can output a content (e.g., 'Wait a minute' shown in FIG. 7 (*b*)) of the whisper message 301-4.

Moreover, according to one embodiment of the present invention, while the content of the whisper message 301-4 is output, referring to FIG. 7 (*b*), if an input for selecting the whisper message 301-4 is received again, the controller 180 can output a one-to-one chat window for a chat with the transmitting terminal of the whisper message 301-4. A control method of outputting the one-to-one chat window will be described in detail with reference to FIG. 12 later.

Meanwhile, according to one embodiment of the present invention, the whisper message 301-4 is output through the transceived message history for a prescribed time only. In addition, if the prescribed time expires, the whisper message 301-4 is not output (FIG. 7 (*c*)). After the whisper message 301-4 has disappeared in the above-mentioned manner, it can be read again by being provided through an individual chat window for a chat with a main sending agent, 'View Whispers', or the like.

Meanwhile, according to the embodiment mentioned in the above description, an input of touching a received message currently output through a chat window is provided as a touch gesture for selecting a prescribed counterpart terminal. In the following description, another input for selecting a prescribed counterpart terminal is described with reference to FIG. 8.

Figure 8:
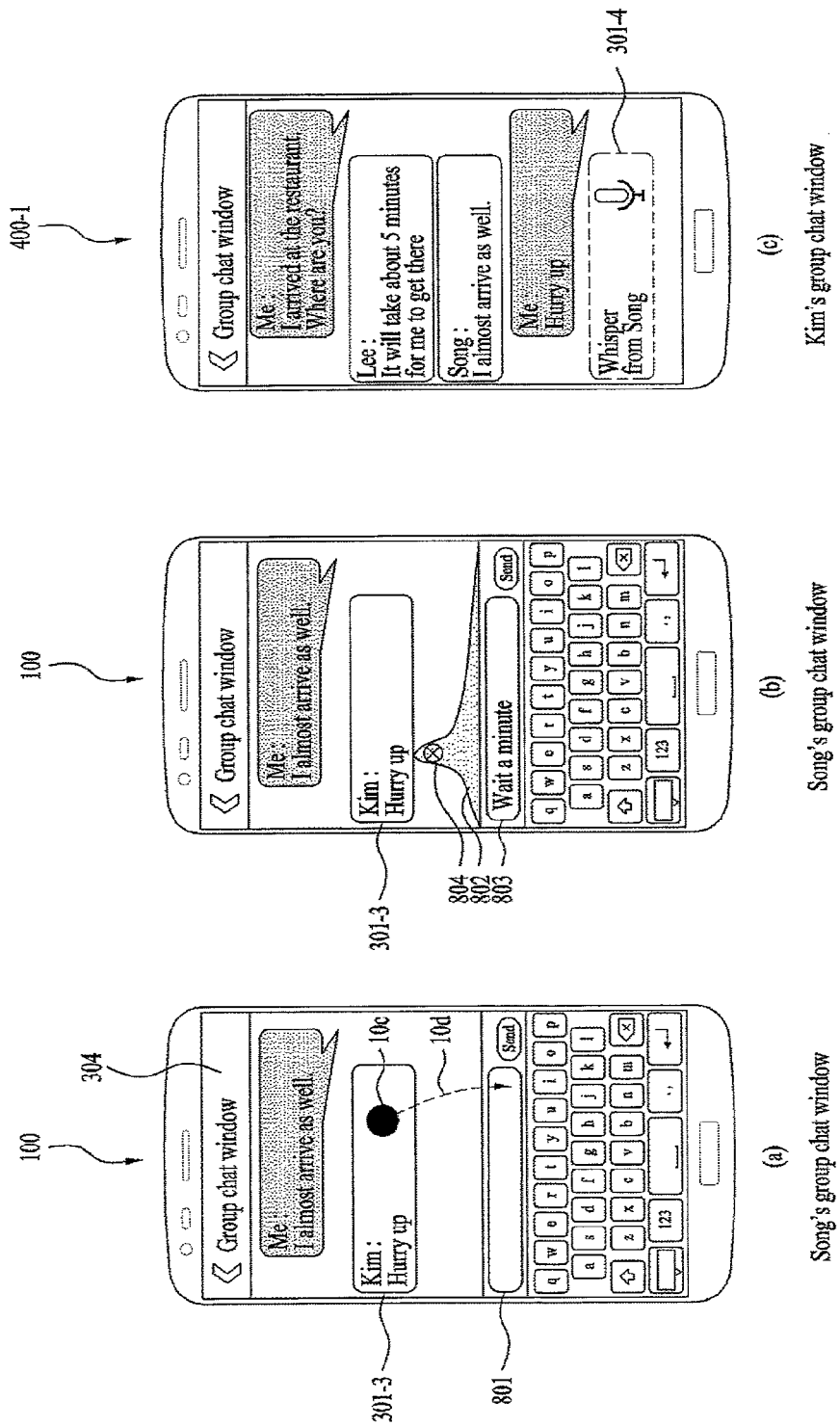
FIG. 8 and FIG. 9 are diagrams illustrating a control method of selecting a prescribed terminal and a control method of cancelling the selection according to one embodiment of the present invention.
Figure 9:
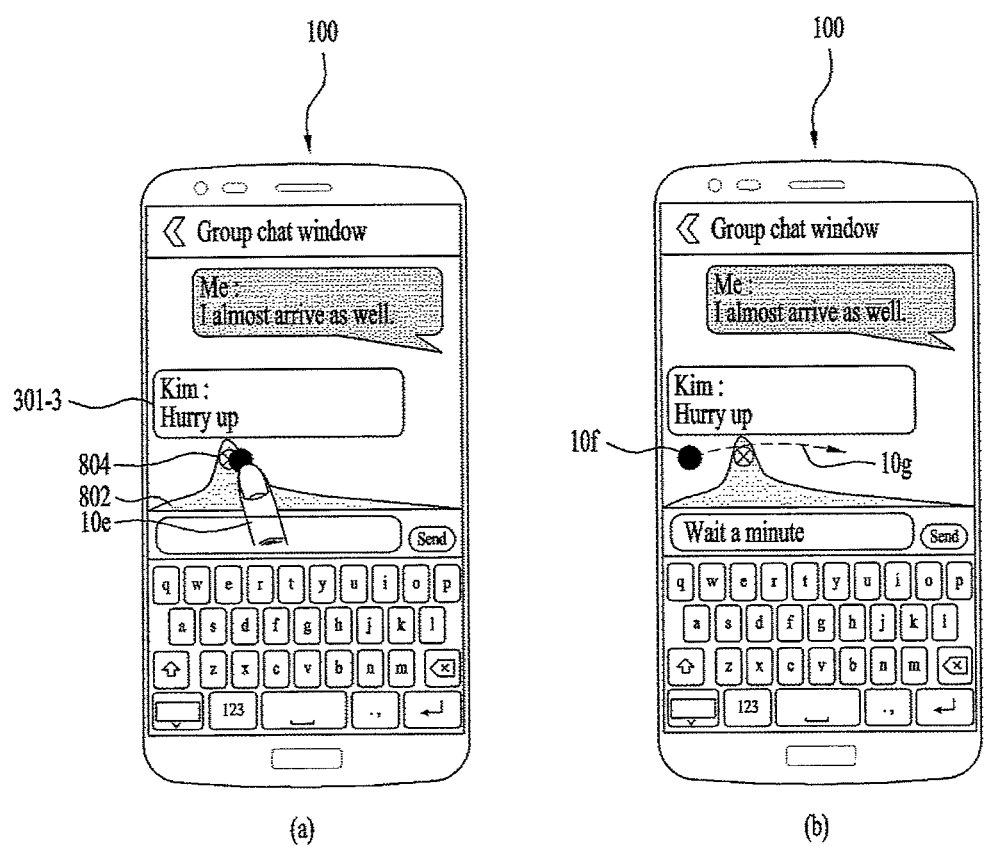

FIG. 8 and FIG. 9 are diagrams illustrating a control method of selecting a prescribed terminal and a control method of cancelling the selection according to one embodiment of the present invention. In particular, FIG. 8 (*a*) and FIG. 8 (*b*) diagrams illustrating configurations of the mobile terminal 100 (i.e., a transmitting terminal) according to one embodiment of the present invention.

Referring to FIG. 8 (*a*), the controller 180 outputs a group chat window 304 and a text input window 801. After a touch 10*c* has been applied to a prescribed received message 301-3, if an input of applying a drag & drop 10*d* to the text input window 801 is received while the touch 10*c* is held, a first counterpart terminal 400-1 corresponding to a sending main agent of the received message 301-3 can be selected.

Moreover, according to one embodiment of the present invention, if a prescribed counterpart terminal is selected, the controller 180 can further output a selection indicator 802 indicating that the prescribed counterpart terminal is selected. According to the selection gesture shown in FIG. 8, since the prescribed counterpart terminal can be selected despite that the touch 10*c* is not held, it is advantageous in attempting to send a continuous whisper message.

If a message 803 is composed through the recognized voice in the step S204 and S205 or the typing in the step S203, the controller 180 can send the composed message as a whisper message to the selected prescribed counterpart terminal 400-1 only. FIG. 8 (*c*) is a diagram illustrating configuration of the first counterpart terminal 400-1 having received the whisper message. Referring to FIG. 8 (*c*), the composed whisper message shown in FIG. 8 (*a*) and FIG. 8 (*b*) is sent to the first counterpart terminal 400-1 only and may be then output through the group chat window.

Meanwhile, according to one embodiment of the present invention, a method of switching to another counterpart terminal from the selected first counterpart terminal 400-1 is further provided. In particular, a whisper to a different counterpart terminal by switching to the different counterpart terminal easily is provided. According to a first switching method, the controller 180 can switch targets, to which a whisper message will be sent, to each other through a right/left flicking touch gesture. According to a second switching method, if an input of pressing a top/bottom/right/left arrow button on a virtual keypad is received, the controller 180 can switch targets, to which a whisper message will be sent, to each other.

A method of cancelling the selection is described in detail with reference to FIG. 9 as follows. Referring to FIG. 9 (*a*), if an input 10*e* of touching a cancellation icon 804 output through the selection indicator 802 is received, the controller 180 can cancel the selection of the prescribed counterpart terminal.

Referring to FIG. 9 (*b*), when a shape of the selection indicator 802 specifies a prescribed received message, if a touch gesture 10*f* and 10*g* applied as if cutting the specified shape is input, the controller 180 can cancel the selection of the prescribed counterpart terminal. In particular, the touch gesture 10*f* and 10*g* may mean a gesture performed by applying a touch 10*f* to one point and then applying a drag 10*g* to another point.

Moreover, the selection cancelling input mentioned in the above description is exemplary only, by which the present embodiment is non-limited. Meanwhile, the above-described whisper message may be read on the group chat window. Yet, according to one embodiment of the present invention, the whisper message can be read on an individual chat window. Such an embodiment is described in detail with reference to FIG. 10 as follows.

Figure 10:
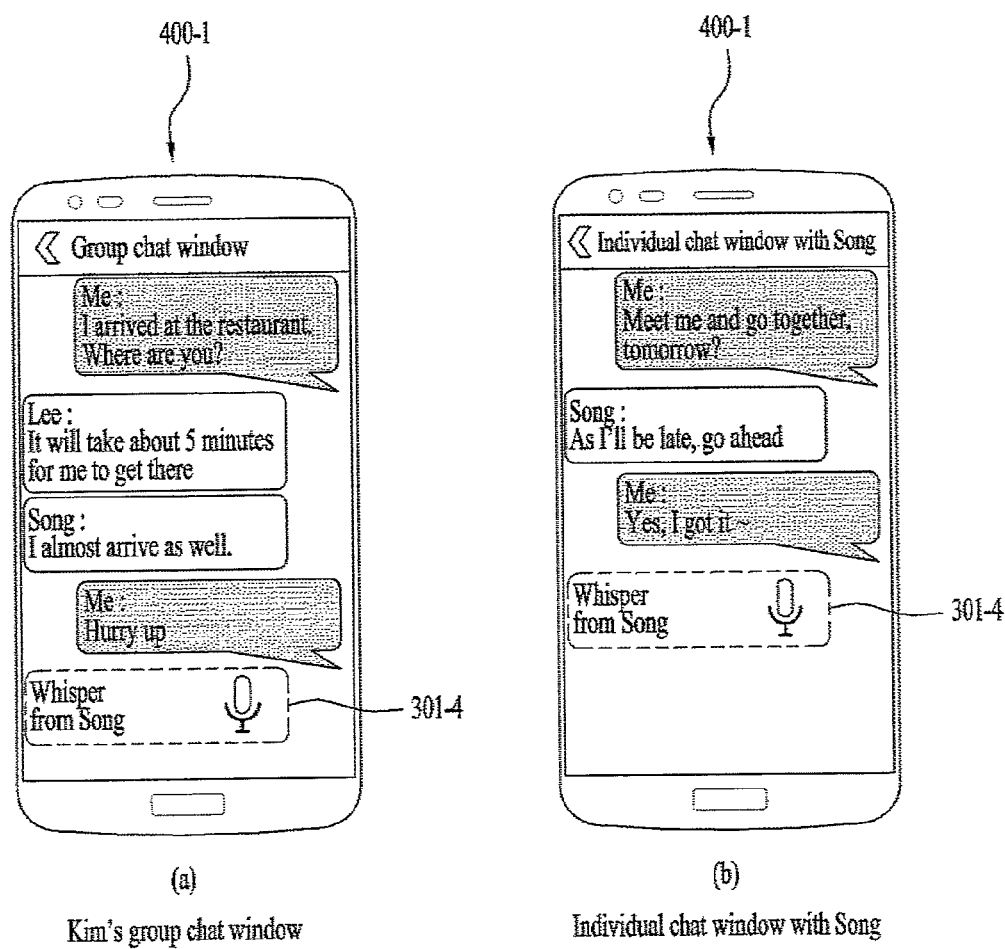
FIG. 10 is a diagram illustrating a control method of reading a whisper message according to one embodiment of the present invention.

FIG. 10 is a diagram illustrating a control method of reading a whisper message according to one embodiment of the present invention. FIG. 10 (*a*) shows a group chat window output by a first counterpart terminal 400-1 having received a whisper message 301-4. In particular, FIG. 10 (*b*) shows an individual chat window output by a first counterpart terminal 400-1 having received a whisper message 301-4. In the drawing, an individual chat window for a chat with a sending main terminal of a whisper message is illustrated. Referring to FIG. 10 (*a*) and FIG. 10 (*b*), the whisper message 301-4 sent through the group chat window can be checked through the individual chat window of the sending main agent as well as through the corresponding group chat window.

Meanwhile, a function of reading and scrolling a message transceived with a specific counterpart terminal is further provided, which is described in detail with reference to FIG. 11 as follows. In particular, FIG. 11 is a diagram illustrating a control method of conveniently reading messages transceived with a prescribed counterpart according to one embodiment of the present invention.

Figure 11:
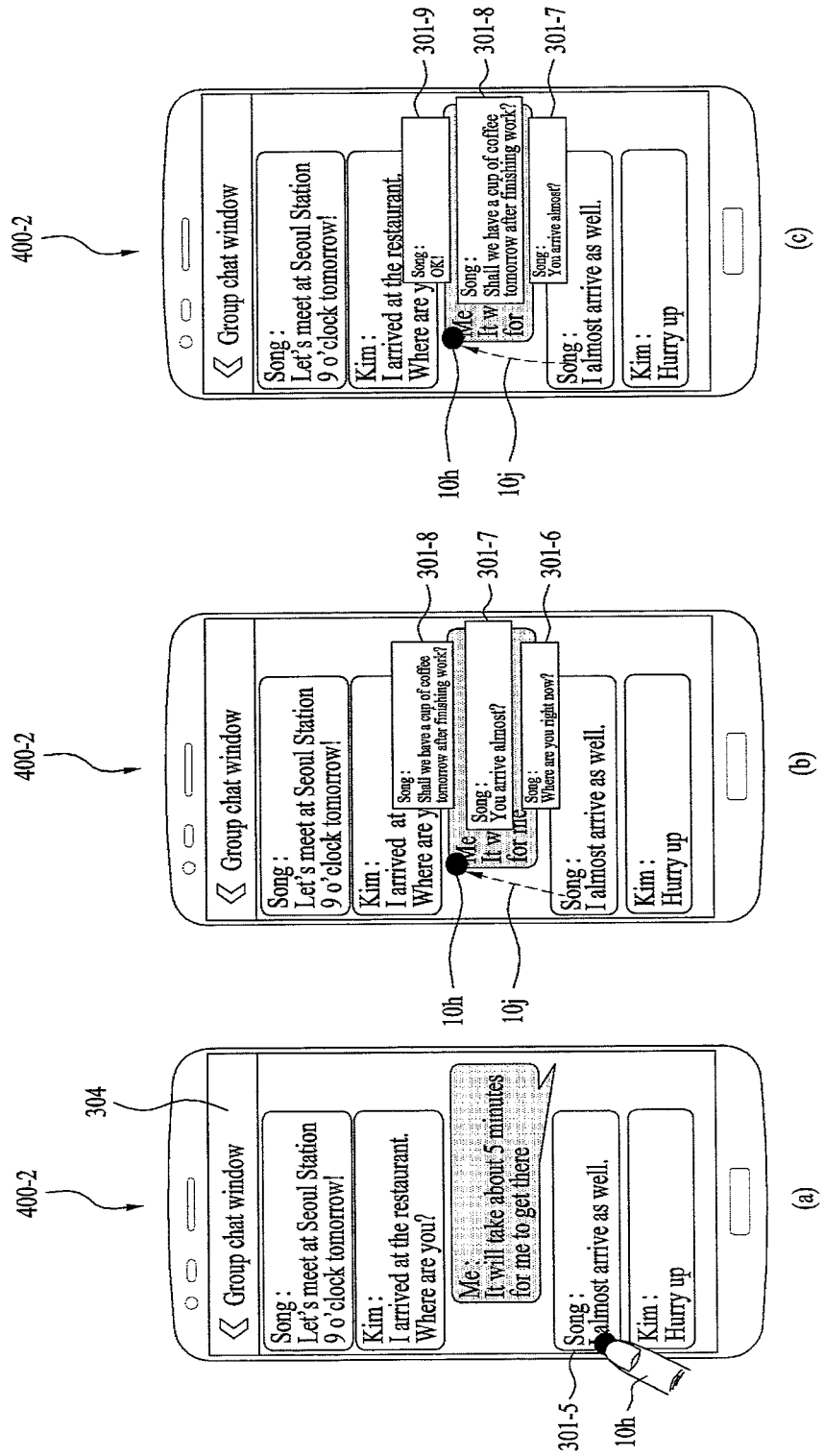
FIG. 11 is a diagram illustrating a control method of conveniently reading messages transceived with a prescribed counterpart according to one embodiment of the present invention.

Referring to FIG. 11 (*a*), the controller 180 currently outputs a group chat window 304. In addition, a received message 30-5 from 'Song' is currently output through the group chat window 304. According to one embodiment of the present invention, if an input of applying a touch 10*h* to the received message 301-5 and then applying a scroll is received, the controller 180 is configured to scroll a list of messages transceived with the sending main agent (FIG. 11 (*b*), FIG. 11 (*c*)).

After the touch 10*h* to the received message 301-5 from 'Song' has been applied, as shown in FIG. 11 (*a*), if a first distance drag 10*j* is applied, the controller 180 can output a list of messages 301-6 to 301-8 transceived with a counterpart terminal of 'Song'. Subsequently, if a second distance drag 103 is applied, the controller 180 can scroll to output the list of the output messages 301-7 to 301-9.

Meanwhile, according to another embodiment of the present invention, the scrolled message may be limited to a whisper message. In particular, as the above-described touch gesture 10*j* and 10*h* is input, the whisper message transceived with the counterpart terminal can be controlled by scroll.

Figure 12:
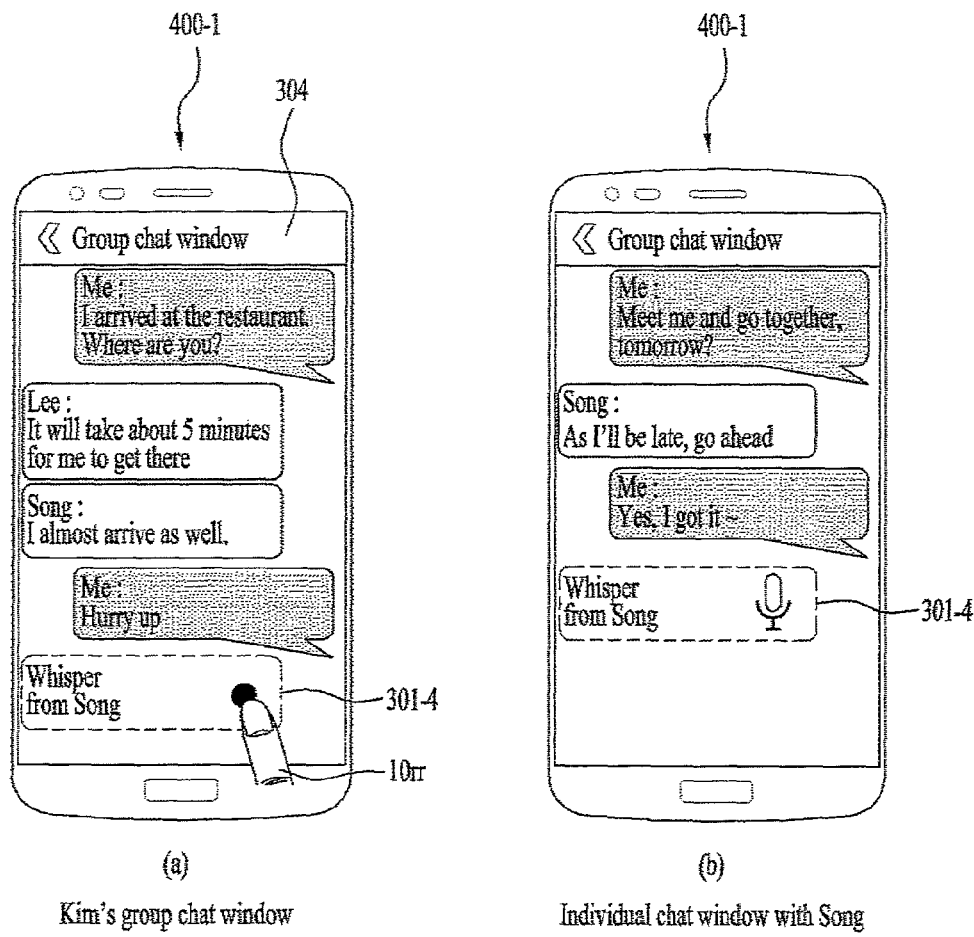
FIG. 12 is a diagram illustrating one example of displaying an individual chat window in case of selecting a whisper message output from a group chat window 304 according to one embodiment of the present invention.

FIG. 12 is a diagram illustrating one example of displaying an individual chat window in case of selecting a whisper message output from a group chat window 304 according to one embodiment of the present invention. Referring to FIG. 12 (*a*), a group chat window output by a first counterpart terminal 4300-1 having received a whisper message 301-4 is illustrated. According to one embodiment of the present invention, if an input 10*rr* for selecting the whisper message 301-4 output through the group chat window 304 is received, the controller 180 is configured to directly switch to an individual chat window for a chat with a counterpart terminal (e.g., a sending counterpart of the whisper message) corresponding to the whisper message 301-4 (FIG. 12 (*b*)). In this instance, as mentioned in the foregoing description of the embodiment with reference to FIG. 10, the received whisper message 301-4 on the group chat window can be displayed on the switched individual chat window.

Figure 13:
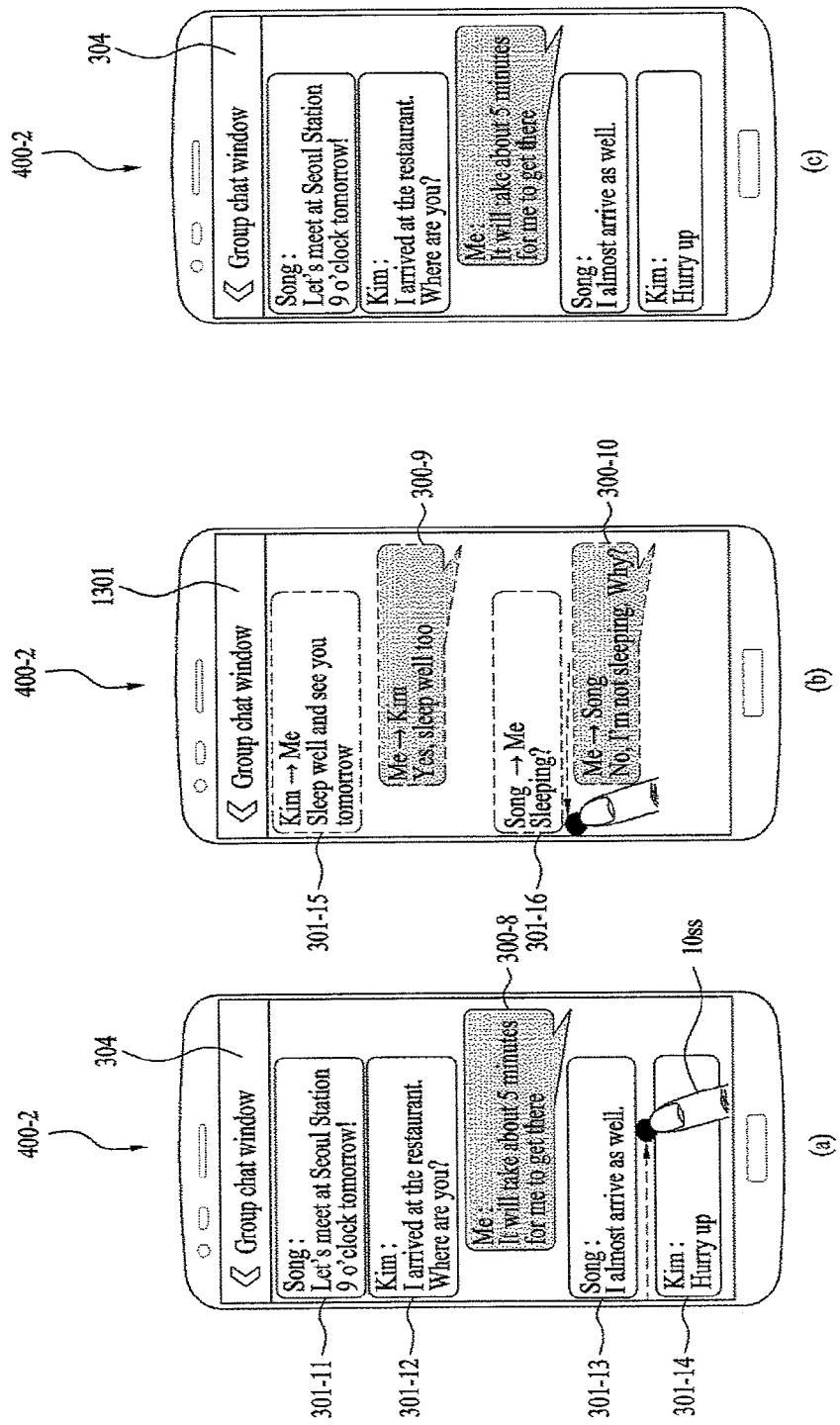
FIG. 13 is a diagram illustrating a control method of collecting and reading a whisper message only in response to an input of a prescribed gesture according to one embodiment of the present invention.

Meanwhile, the controller 180 is configured to collect and output whisper messages based on a prescribed gesture input. FIG. 13 is a diagram illustrating a control method of collecting and reading a whisper message only in response to an input of a prescribed gesture according to one embodiment of the present invention. Referring to FIG. 13 (*a*), the controller 180 currently outputs received messages 301-11 to 301-14 through a group chat window 304 and also outputs a sent message 300-8. In particular, like the embodiment mentioned in the foregoing description, the controller 180 currently outputs a general group chat window 304.

If a prescribed gesture is received, the controller 180 collects the whisper messages from the group chat window 304 and then outputs the collected whisper messages only. According to the example shown in the drawing, the prescribed gesture includes a gesture 10ss performed by touching a prescribed edge of the touchscreen 151 and then applying a drag 10ss toward an inside of the touchscreen 151.

In particular, if the gesture 10ss is received, referring to FIG. 13 (b), the controller 180 can display a whisper chat window 1301 for collecting and outputting the transceived whisper message 300-9, 300-10, 301-15 and 301-16 only. If a gesture 10tt of touch & drag in reverse direction is received, referring to FIG. 13 (c), the controller 180 can return to the general group chat window 304 again.

Figure 14:
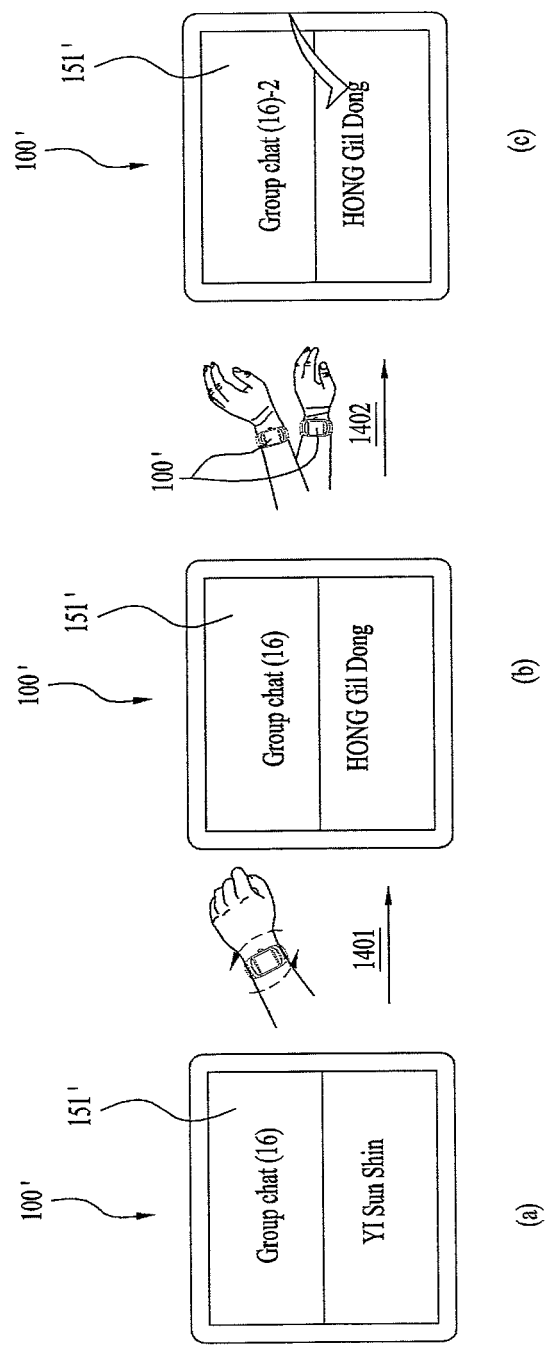
FIG. 14 is a diagram illustrating a control method of easily setting a message receiving counterpart based on a wearable terminal 100' according to one embodiment of the present invention.

In the following description, a control method of easily setting a message receiving counterpart is proposed with reference to FIG. 14. FIG. 14 is a diagram illustrating a control method of easily setting a message receiving counterpart based on a wearable terminal 100' according to one embodiment of the present invention.

According to the embodiment related to FIG. 14, the controller 180 is configured to receive a user's gesture input based on a wearable terminal 100' worn on a wrist and to designate a message receiving counterpart in response to the gesture input. Referring to FIG. 14, the controller 180 can sequentially switch a counterpart output through a touchscreen 151' in response to a first gesture 1401. After a first counterpart 'YI Sun Shin' has been output, if a first gesture 1401 is input, the controller 180 can switch the first counterpart to a second counterpart (HONG Gil Dong) (FIG. 14 (a), FIG. 14 (b)). Further, one example of the first gesture 1401 may include a gesture of rotating the wrist having the wearable terminal 100' worn thereon.

If a second gesture 1402 is input, the controller 180 can designate the second counterpart as a message receiving counterpart (FIG. 14 (b), FIG. 14 (c)). Further, one example of the second gesture 1402 may include a gesture 1402 of bending a wrist upward. Further, if a user intends to cancel the designation, a gesture of bending the wrist downward may be usable. Meanwhile, when a user's voice input is recognized, it may happen that the user's voice input is not correctly recognized. Hence, a control method of correcting an incorrect recognition is proposed as follows.

Figure 15:
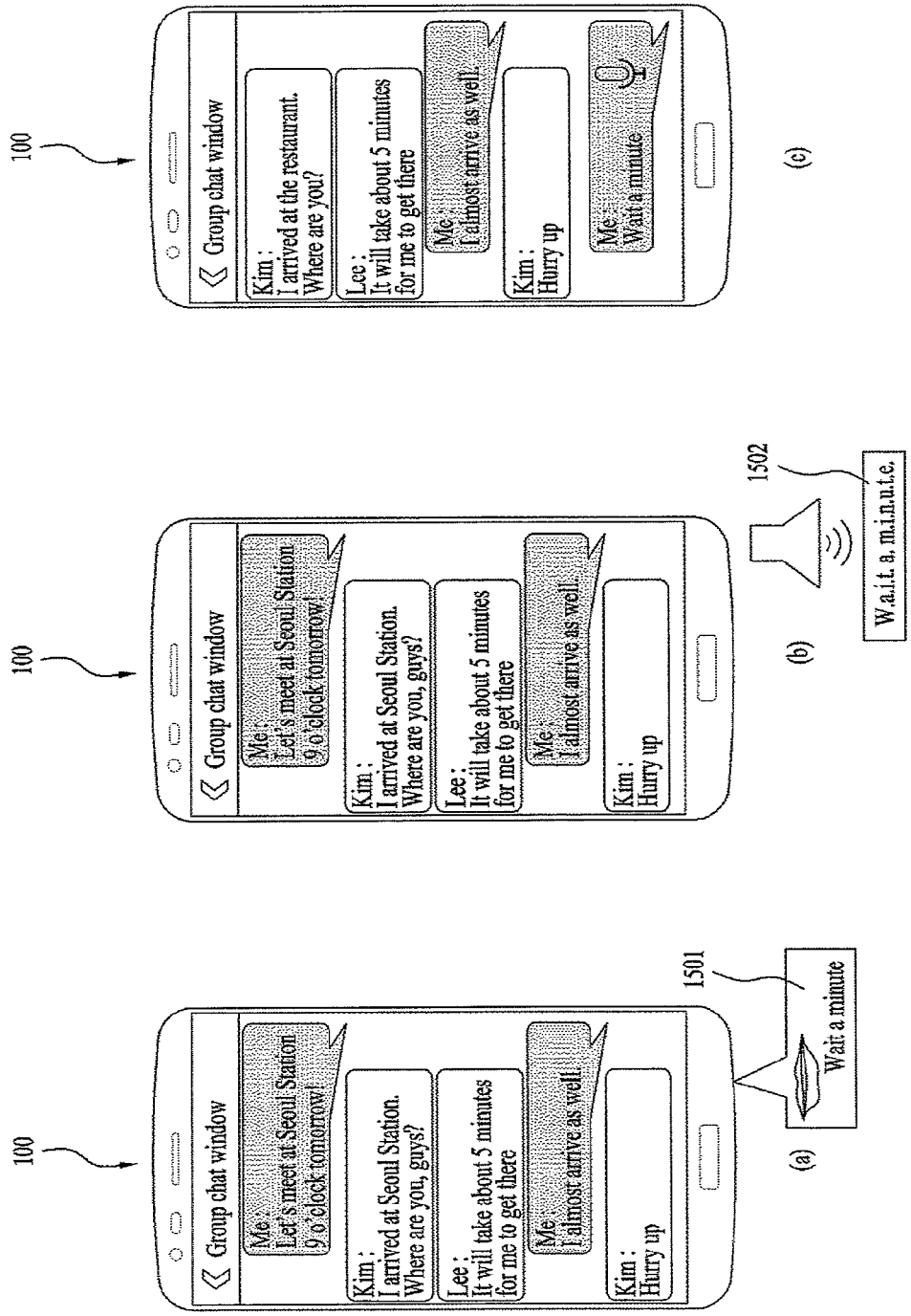
FIG. 15 is a diagram illustrating a control method of feeding back a recognized voice to a user in case of performing a voice recognition according to one embodiment of the present invention.

FIG. 15 is a diagram illustrating a control method of feeding back a recognized voice to a user in case of performing a voice recognition according to one embodiment of the present invention. Referring to FIG. 15 (a), the controller 180 currently outputs an execution screen of a message transceiving application. In order to compose a message to send, a user can input a prescribed voice 1501 through the microphone 122.

If the voice input 1501 is received from the user, the controller 180 converts the received voice input 1501 by STT and can then give a feedback 1502 of the converted input to the user. Based on the output feedback 1502, the user may check whether the voice input 1501 is correctly converted before sending the voice input 1501 as a message. Meanwhile, referring to FIG. 15 (b), the aforementioned feedback 1502 can be output by being broken into letter units in order to receive a correction command from the user. If the feedback of the letters to be corrected is output, the user can correct the corresponding letters by inputting a correction command in direct.

After the feedback 1502 has been output, if a prescribed time expires, the controller 180 can automatically send the corresponding voice input 1501 as a message. Further, the sent message may include audio data of recording the voice input 1501 of itself or text data of text converting from the voice input 1501 (FIG. 15 (c)).

Figure 16:
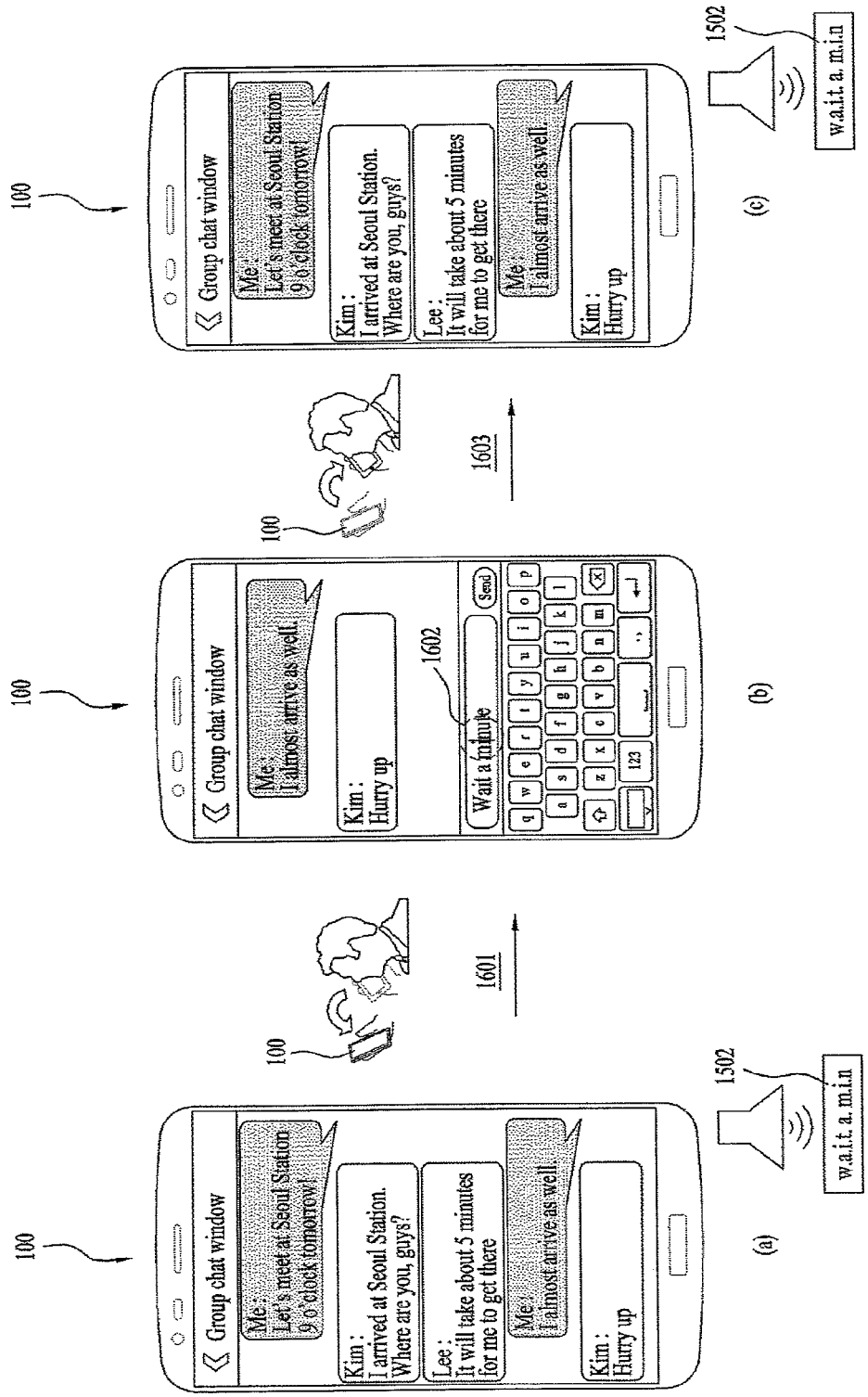
FIG. 16 is a diagram illustrating a control method of correcting a voice recognition result by letter units according to one embodiment of the present invention.

A control method of correction by letter units is described in detail with reference to FIG. 16 as follows. FIG. 16 is a diagram illustrating a control method of correcting a voice recognition result by letter units according to one embodiment of the present invention. Referring to FIG. 16 (a), as mentioned in the foregoing description with reference to FIG. 15, the controller 180 currently outputs the feedback 1502. While the feedback 1502 is output by being broken into letter units, if a gesture 1602 of detaching the mobile terminal 100 from an ear (or a gesture of watching the touchscreen in front) is received, the controller 180 can place a cursor 1602 at a currently output letter (FIG. 16 (b)). In particular, the cursor 1602 is automatically moved to the location for correction.

After the user has corrected a desired letter through the touchscreen 151, if a gesture 1603 of holding the mobile terminal 100 to the ear is received, the controller 180 can output the feedback 1502 having the corrected letter reflected therein again (FIG. 16 (c)). Further, after the touchscreen 151 has been checked, if the gesture 1603 of holding the mobile terminal 100 to the ear is received, the controller 180 can output the feedback 1502 shown in FIG. 16 (a) once more.

A control method of designating a range of c cursor by word unit as well as a location of a cursor is described in detail with reference to FIG. 17 as follows. In particular, FIG. 17 and FIG. 18 are diagrams illustrating a control method of specifying a voice recognized text data by word units and correcting the specified data according to one embodiment of the present invention.

Figure 17:
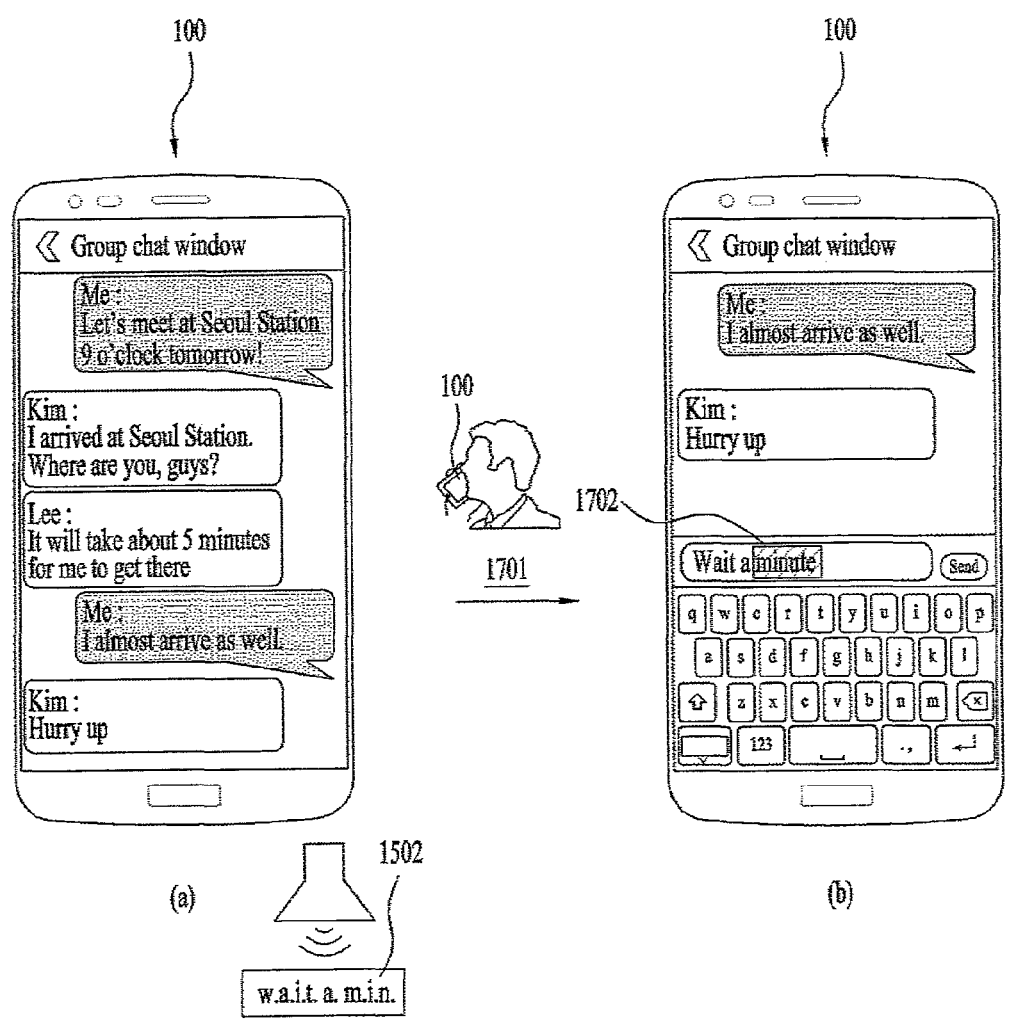
FIG. 17 and FIG. 18 are diagrams illustrating a control method of specifying a voice recognized text data by word units and correcting the specified data according to one embodiment of the present invention.

Referring to FIG. 17 (a), as mentioned in the foregoing description with reference to FIG. 15, the controller 180 currently outputs the feedback 1502. While the feedback 1502 is output by being broken into letter units, if a gesture 1701 of shaking the mobile terminal 100 is received, the controller 180 can specify a currently output word with a cursor (FIG. 17 (b)). In particular, the word unit desired to be corrected can be specified automatically with the cursor 1702. A location of a cursor is specified only according to the embodiment related to FIG. 16. Yet, a location and region of a cursor are specified according to the embodiment related to FIG. 17.

A control method of correcting a word specified with a cursor is described in detail with reference to FIG. 18 as follows. Referring to FIG. 18 (a), as mentioned in the foregoing description with reference to FIG. 17, a prescribed word is specified with a cursor 1702. If a voice 1801 desired to be corrected is input by a user, the controller 180 can replace the word specified with the cursor 1702 by the input voice 1801.

Figure 18:
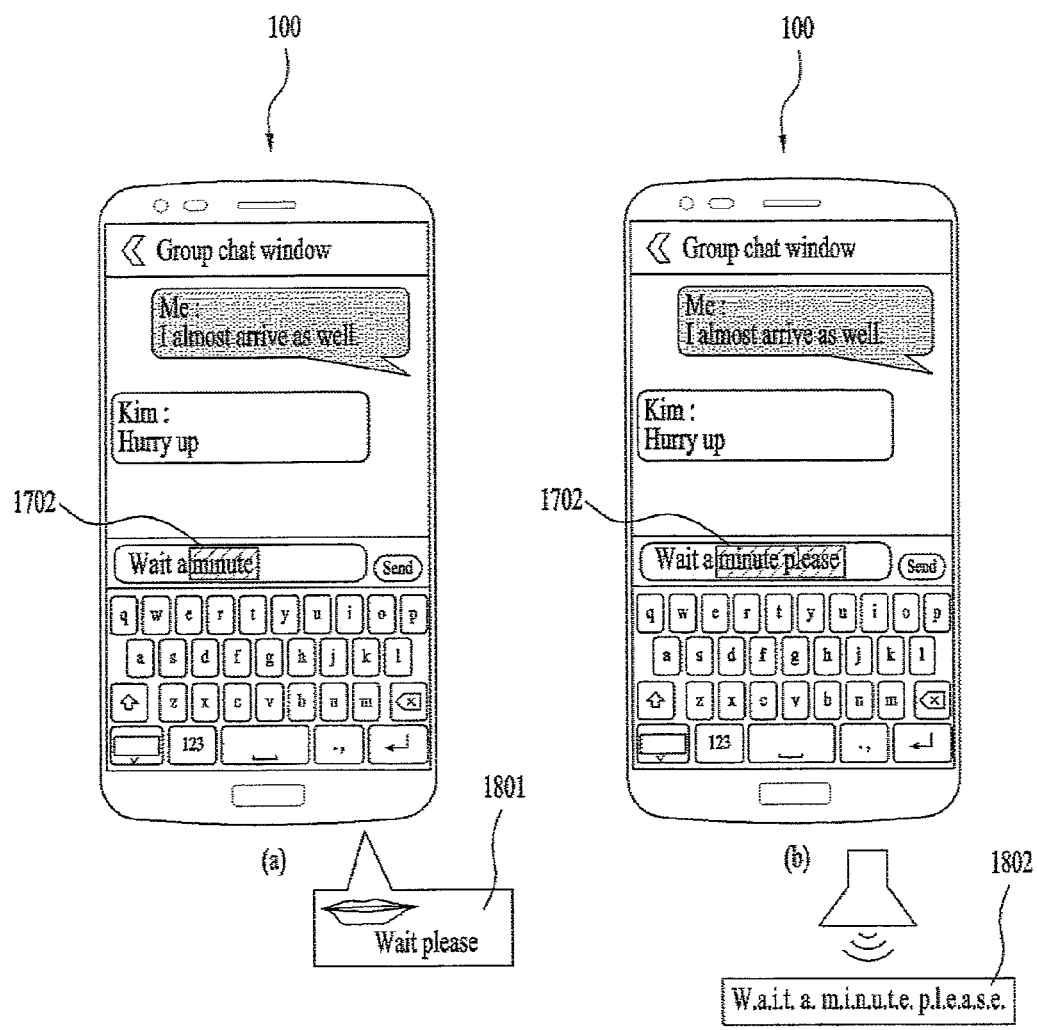

In particular, if the correction voice 'wait please' 1801 is input (FIG. 18 (a)), the controller 180 can correct 'wait' specified by the cursor 1702 into 'wait please' (FIG. 18 (b)). After the correction, the controller 180 outputs a feedback 1802 having the corrected voice reflected therein, thereby informing the user that the correction is complete. In the following description, a control method of re-playing a voice feedback is explained in detail with reference to FIG. 19.

Figure 19:
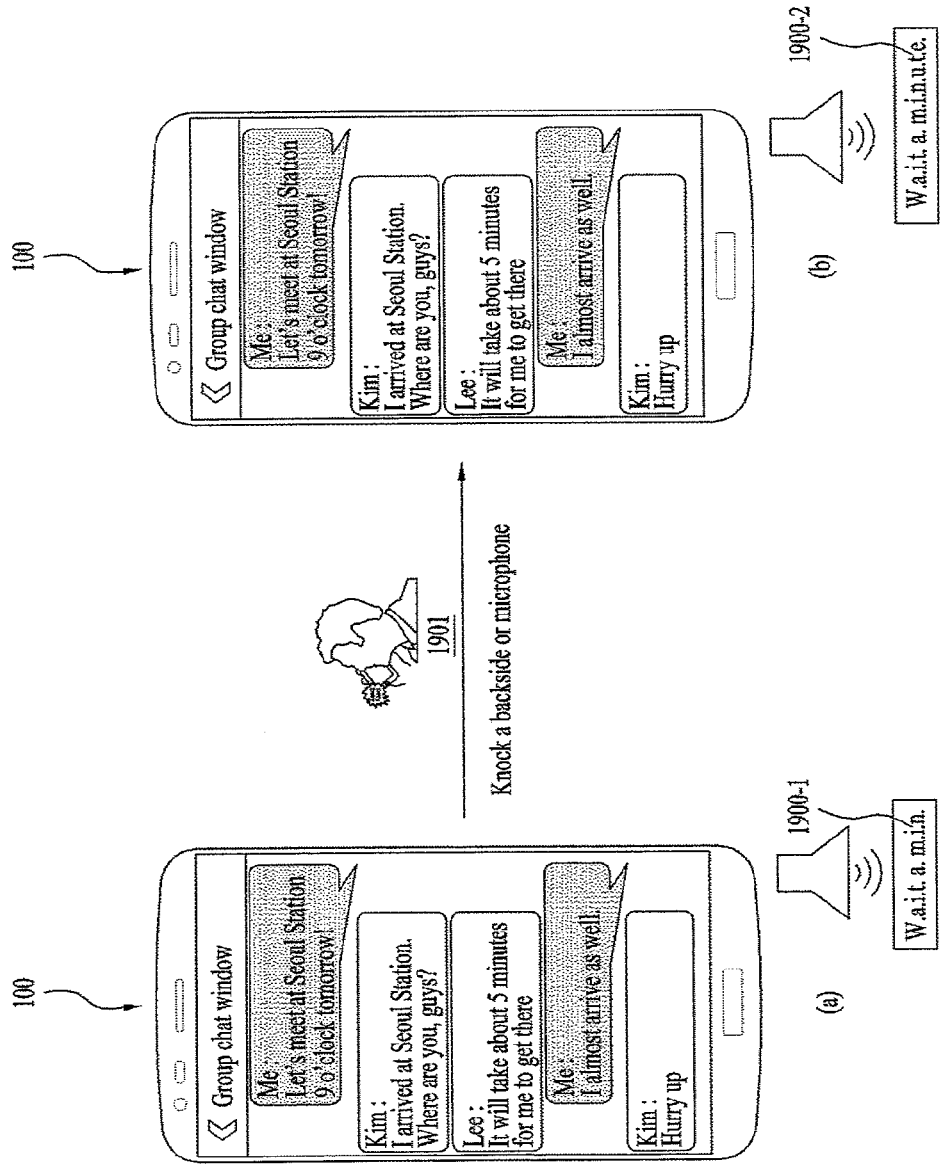
FIG. 19 is a diagram illustrating a control method of re-outputting an output of a voice feedback according to one embodiment of the present invention.

FIG. 19 is a diagram illustrating a control method of re-outputting an output of a voice feedback according to one embodiment of the present invention. Referring to FIG. 19 (a), the controller 180 currently re-outputs a text recognized in response to a prescribed voice input as a first feedback 1900-1 through the audio output unit 152.

If a gesture 1901 for requesting a re-output is received, the controller 180 can output a second feedback 1900-2 identical to the first feedback 1900-1 to a user (FIG. 19 (*b*)). According to the example related to FIG. 19, a gesture of knocking a specific location (e.g., microphone 122) of the mobile terminal 100 twice is taken as the gesture 1901 for requesting the re-output, by which the present embodiment is non-limited. When a user fails to correctly hear the feedback due to ambient noise and the like, the user can make a request for an output of a feedback again.

Figure 20:
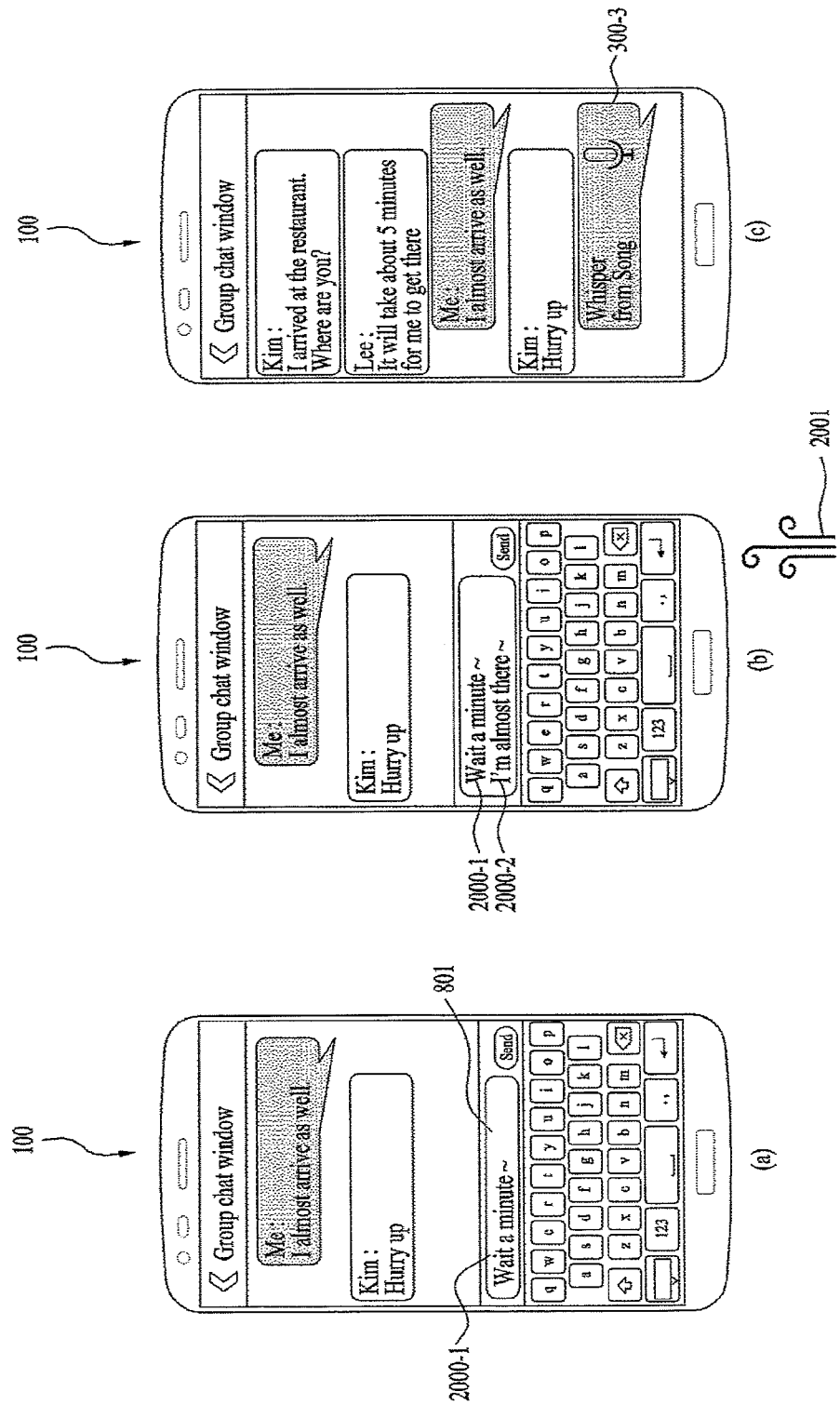
FIG. 20 is a diagram illustrating a control method of sending a text converting from a voice according to one embodiment of the present invention.

A control method of sending a message converting from a recognized voice is described in detail as follows. FIG. 20 is a diagram illustrating a control method of sending a text converting from a voice according to one embodiment of the present invention. According to the embodiment related to FIG. 20, assume that a voice input is performed step by step.

Referring to FIG. 20 (*a*), a first message 2000-1 recognized according to a first voice input is displayed on a text input window 801. If another voice input is additionally received, the controller 180 recognizes the additional voice input, converts it into a second message 200-2 and can then add the second message 2000-2 to the text input window 801 (FIG. 20 (*b*)).

If a message send command is received, the controller 180 can control the message input to the text input window 801 to be sent (FIG. 20 (*c*)). According to one embodiment of the present invention, an input 200 of blowing user's breath may be taken as one example of the message send command. The breath blowing input 2001 may be detected based on a change of temperature and/or humidity through the sensing unit 140 configured to detect the temperature and/or humidity or a change of an audio input received through the microphone 122. Referring to FIG. 20 (*c*), it can be observed that the first and second messages 2000-1 and 2000-2 contained in the text input window 801 by being composed in FIG. 20 (*b*) are included as a sent message 300-3 in the transceived message history.

Figure 21:
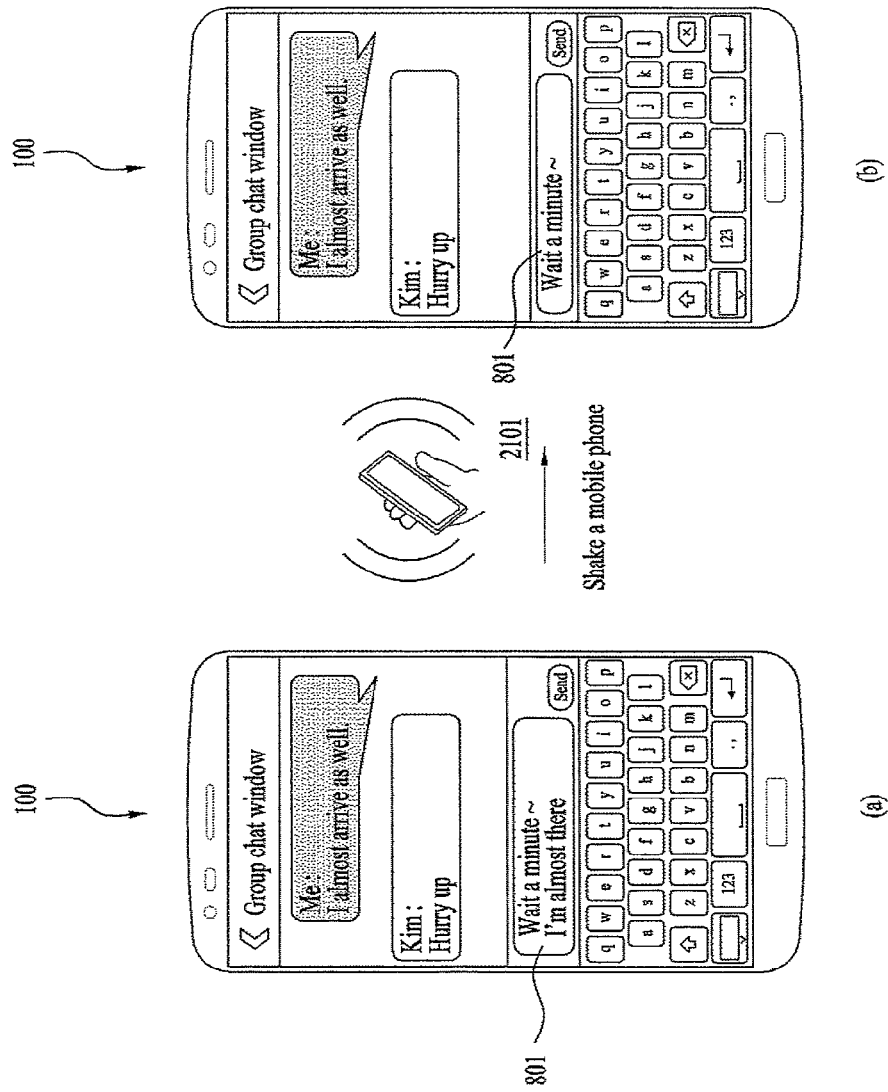
FIG. 21 is a diagram illustrating a control method of removing a text by sentence units based on a voice recognition according to one embodiment of the present invention.

FIG. 21 is a diagram illustrating a control method of removing a text by sentence units based on a voice recognition according to one embodiment of the present invention. Referring to FIG. 21 (*a*), the controller 180 currently outputs a state, which indicates that a prescribed message is input to a text input window 801 of a message transceiving application, through the touchscreen 151.

If a command for deleting a sentence is received, the controller 180 can delete the prescribed message input to the text input window 801 by sentence units (FIG. 21 (*b*)). According to the example shown in FIG. 21, the command for deleting the sentence may include a gesture 2101 of shaking the mobile terminal 100. Thereafter, as mentioned in the foregoing description with reference to FIG. 20, if a message send command (e.g., an input of blowing user's breath, etc.) is received, the rest of the message except the deleted sentence can be sent to a receiving counterpart.

Figure 22:
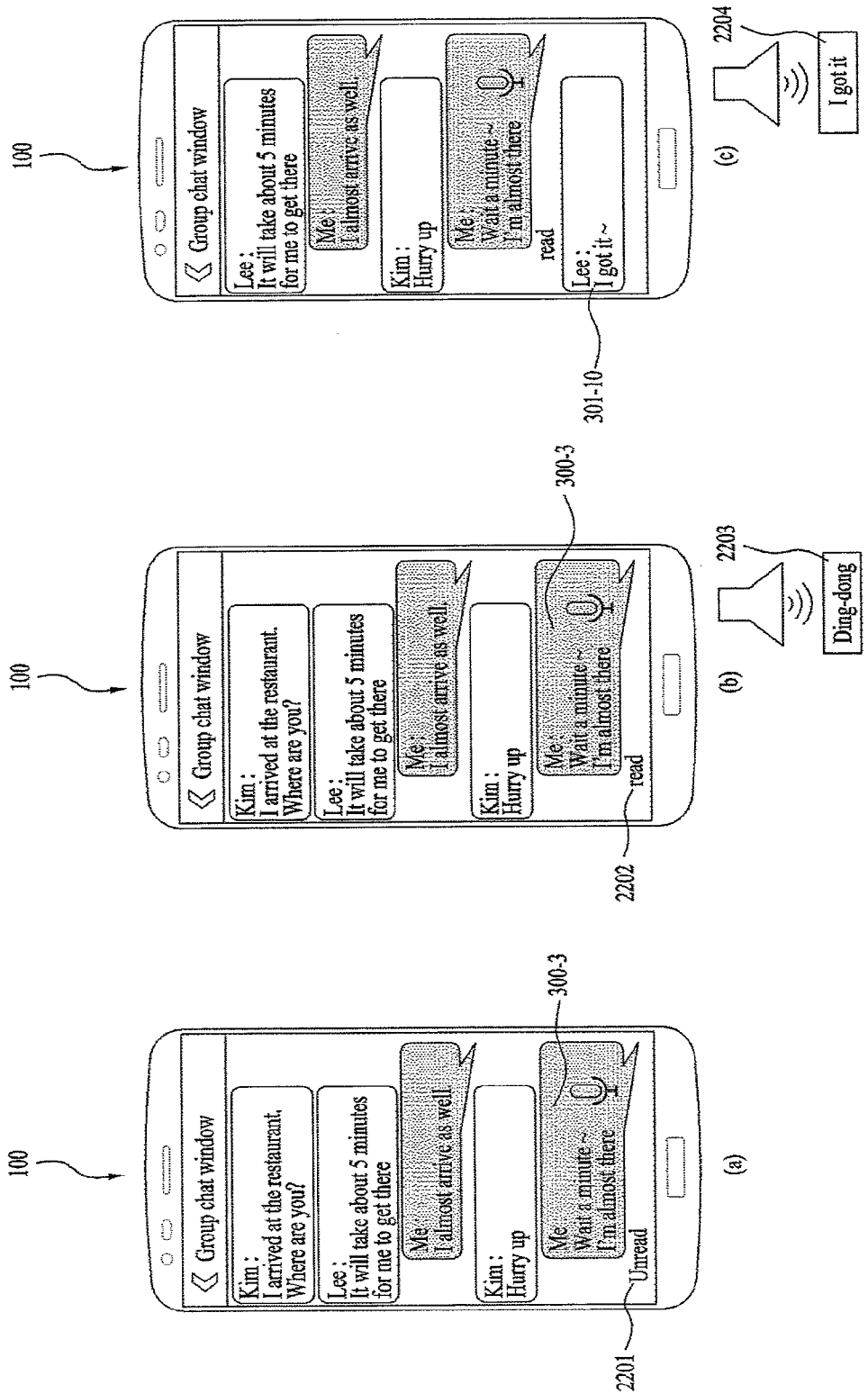
FIG. 22 is a diagram illustrating a control method of automatically reading a received message while holding a mobile terminal 100 to a user's ear according to one embodiment of the present invention.

FIG. 22 is a diagram illustrating a control method of automatically reading a received message while holding a mobile terminal 100 to a user's ear according to one embodiment of the present invention. Referring to FIG. 22 (*a*), the controller 180 has sent a prescribed sent message 30-3 to a message receiving counterpart. According to one embodiment of the present invention, the controller 180 is configured to further output an indicator 2201/2202 for indicating whether the sent message 300-3 is checked by the corresponding counterpart.

In particular, before the receiving counterpart checks the sent message 300-3, the controller 180 can output the indicator 'unread' 2201. After the receiving counterpart has checked the sent message 300-3, the controller 180 can output the indicator 'read' 2202. Moreover, according to one embodiment of the present invention, while the user holds the mobile terminal 100 to the user's ear, if the receiving counterpart checks the sent message 300-3, the controller 180 can output a preset 'read' notification 2203 (FIG. 22(*b*)). While the mobile terminal 100 is held to the user's ear, if a message is received from a counterpart terminal, the controller 180 can output the received message by converting the received message into a voice 2204 by TTS (text to speech) (FIG. 22 (*c*)).

Figure 23:
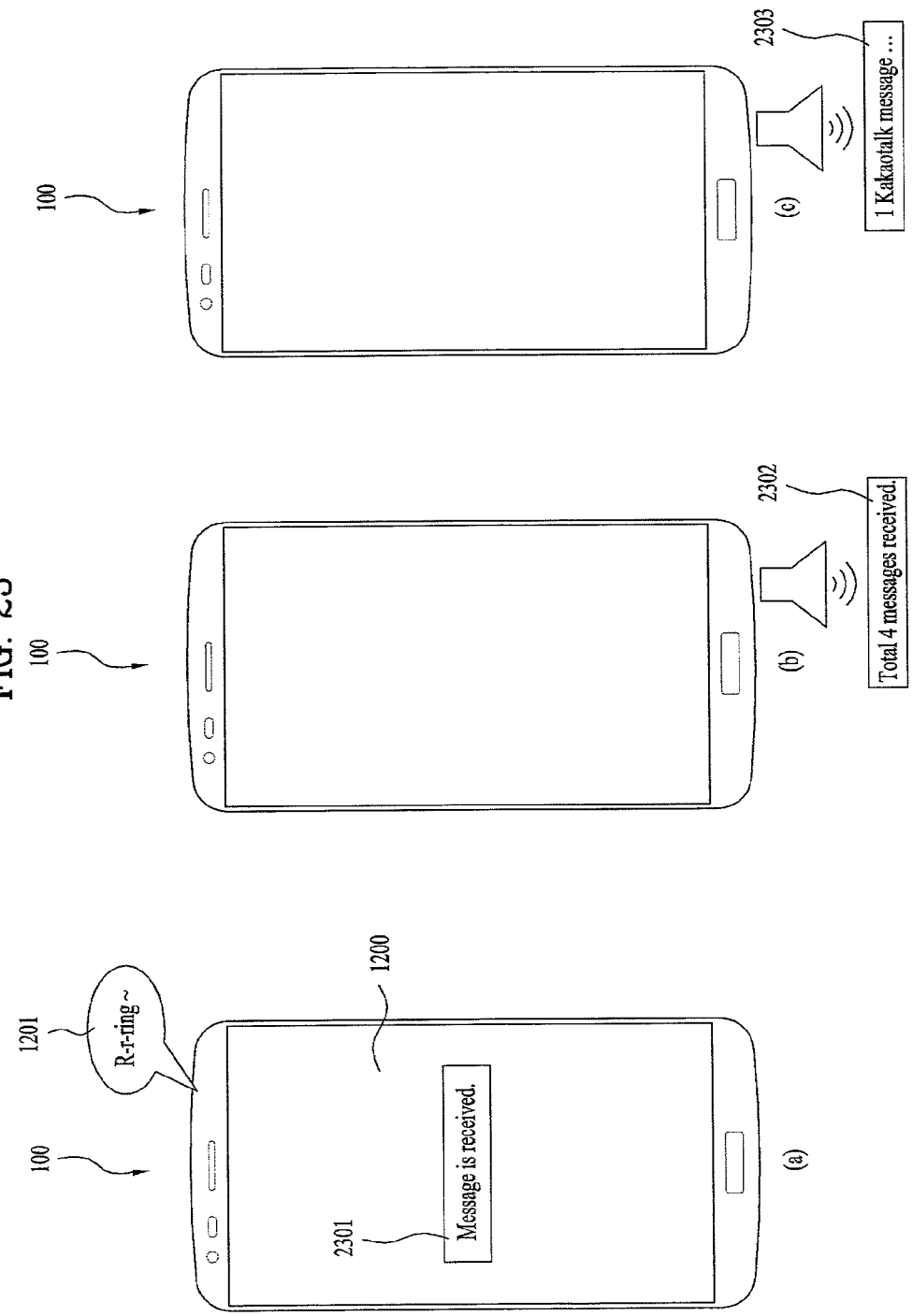
FIG. 23 is a diagram illustrating a method of controlling a received message reading form according to one embodiment of the present invention.

FIG. 23 is a diagram illustrating a method of controlling a received message reading form according to one embodiment of the present invention. Referring to FIG. 23 (*a*), while a standby screen 1200 is output, if a message is received, the controller 180 can output a popup window 2301 for indicating a reception of the message to the standby screen 1200. Thus, after the message has been received, if a gesture of holding the mobile terminal 100 to an ear is input, the controller 180 can read the received message in a first form 2302 (FIG. 23 (*b*)). While the touchscreen 151 is touched, if a gesture of holding the mobile terminal 100 to an ear is input, the controller 180 can read the received message in a second form 2303 (FIG. 23 (*c*)).

According to the example shown in FIG. 23, the first form 2302 may include a form to indicate the total number of the received messages. And, the second form 2302 may include a form to indicate the number of the messages received per message application. Furthermore, without being limited by the example shown in FIG. 23, the first form 2302 may include a form to read the entire received messages sequentially. And, the second form 2303 may include a form to sequentially read texts (e.g., messages received through a specific application) related to a last received message.

Meanwhile, if a user controls the mobile terminal 100 using a voice, the corresponding voice may be input as a text data or a prescribed function may be run based on the corresponding voice. Yet, it may be difficult to distinguish the function with the recognition of the voice only. Therefore, according to one embodiment of the present invention, the controller 180 is configured to perform the distinguishment through a combination with a touch gesture. Such embodiments will be described in detail with reference to FIGS. 24 to 34 as follows.

Figure 24:
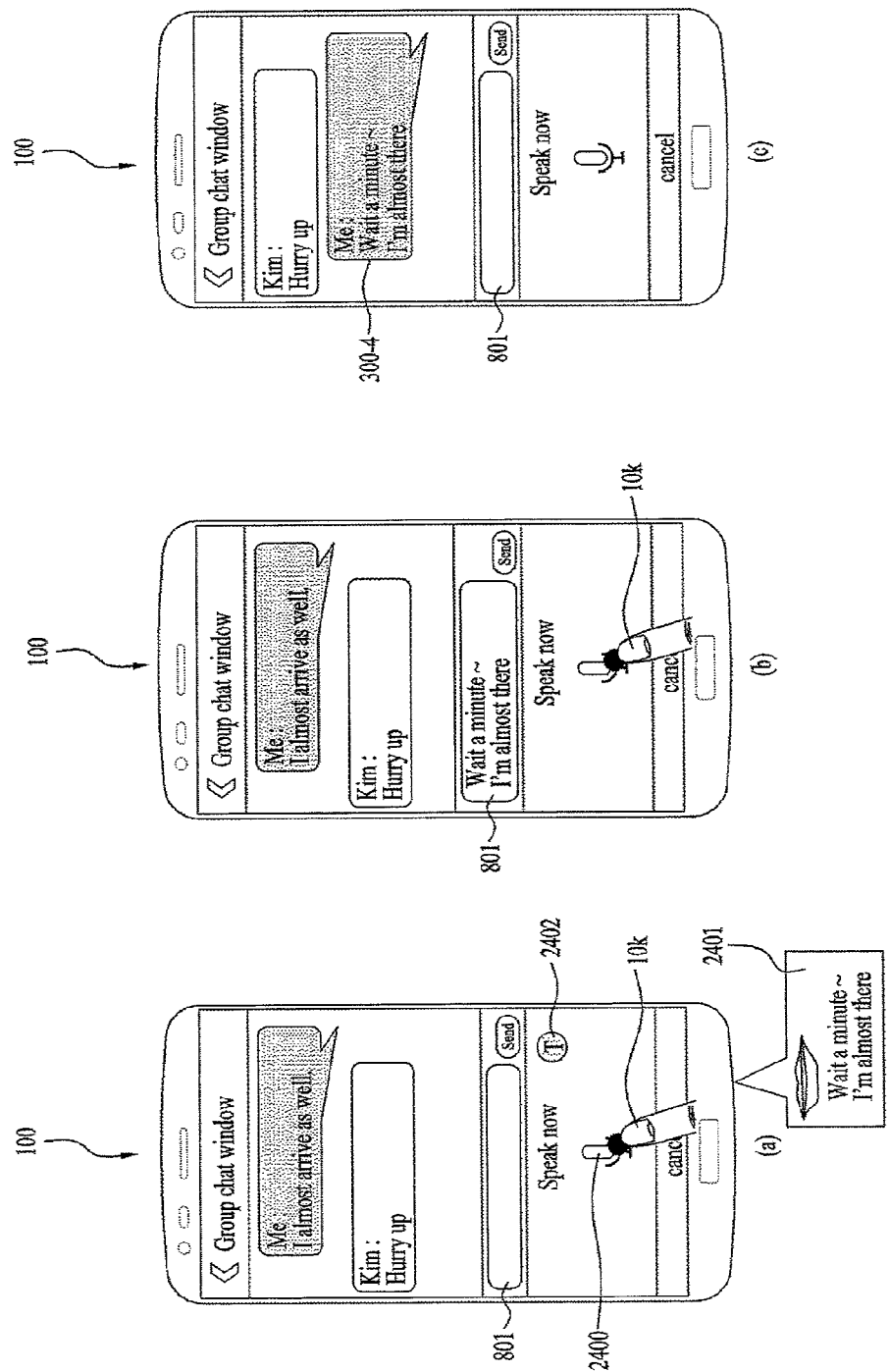
FIG. 24 is a diagram illustrating one example of composing a message by converting a voice received from a user into a text data according to one embodiment of the present invention.

FIG. 24 is a diagram illustrating one example of composing a message by converting a voice received from a user into a text data according to one embodiment of the present invention. Referring to FIG. 24 (*a*), the controller 180 outputs a microphone activate button 2400 together with a text input window 801 on a message transceiving application. If a touch 10*k* to the microphone activate button 2400 is held, the controller 180 recognizes a user's voice 2401 received while holding the touch 10*k* and can input the recognized voice to the message input window 801 (FIG. 24 (*b*)). Further, the user's recognized voice 2401 may be output to the message input window 801 in real time.

Meanwhile, depending on whether the above-mentioned microphone activate button 2400 is touched, the controller 180 can activate/deactivate a power of a module of the microphone 122. In particular, only if the microphone activate button 2400 is touched, the controller 180 can activate the mobile of the microphone 122 or run a voice analysis function of the activated module of the microphone 122.

Moreover, according to one embodiment of the present invention related to FIG. 24, if the touch 10k is released, the controller 180 can control the input message to be sent in direct (FIG. 24 (c)). Moreover, as mentioned in the foregoing description with reference to FIG. 20, if a user's breath is detected, the controller 180 can control the input message to be sent in direct.

Meanwhile, instead of composing a message based on an applied voice input, a control method of executing a function mapped to a voice input is explained in the following description of an embodiment. In order to distinguish the applied voice input, according to one embodiment of the present invention, the controller 180 can further output a message compose indicator 2402 to guide a user in composing a message with a voice input.

Figure 25:
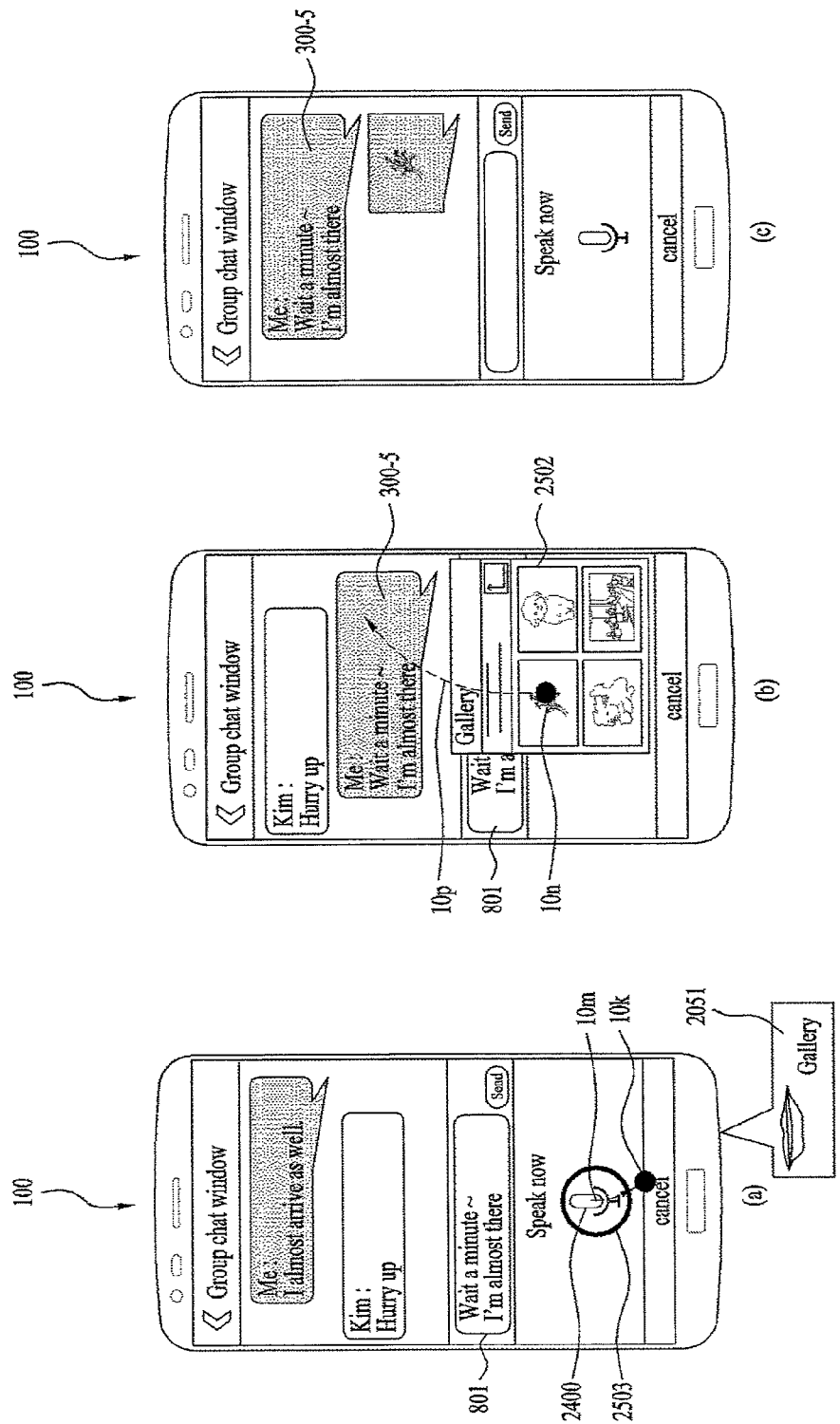
FIG. 25 is a diagram illustrating a control method of sending a photo together with a voice 2401 received from a user according to one embodiment of the present invention.

In the following description, a control method of sending a message by attaching a photo to the message is described in detail with reference to FIG. 25. FIG. 25 is a diagram illustrating a control method of sending a photo together with a voice 2401 received from a user according to one embodiment of the present invention. Referring to FIG. 25 (a), as mentioned in the foregoing description with reference to FIG. 24, a state that the prescribed message is input to the message input window 801 by the user voice 2401 (hereinafter called a first voice in the embodiment related to FIG. 25). In addition, when the first user voice 2401 is input, the touch 10k is assumed as held without being released.

While the touch 10k is held, if a prescribed touch gesture is received, the controller 180 can run a prescribed function based on a second voice 2501 that is input additionally. If 'gallery' is input as the second voice 2501 (FIG. 25 (a)), the controller 180 can output an execution screen of a gallery application mapped to the input second voice (FIG. 25 (b)). Further, the output execution screen of the gallery application can be output as a popup window 2502. In particular, in response to a touch gesture, the controller 180 can distinguish whether to covert a received voice into a text data or to run a function.

According to one embodiment of the present invention, in order to guide a user in the distinguishment, the controller 180 is configured to further output a separate identification indicator. In particular, based on the output identification indicator, a user can distinguish whether the voice input is converted into the text data or whether the function is run. For instance, referring to FIG. 25 (a), in response to a prescribed touch gesture, it can further output a function recognition indicator 2602. In this instance, the function recognition indicator 2602 may mean an indicator indicating a state for executing a function instead of text conversion based on a user's voice input.

The above-mentioned indicator output is just one example. Alternatively, a user can be guided by changing a color, size and/or shape of the microphone activate button 2400. As mentioned in the foregoing description, if the touch 10k is released, referring to FIG. 25 (b), the controller 180 sends the input message and can output the corresponding message as a sent message 300-5 to the transceived message history.

After a prescribed photo 10n has been selected from the execution screen of the gallery application, if a drag 10p for dragging the selected photo to the message transceiving application is applied (FIG. 25 (b)), the controller 180 can send the selected photo to a counterpart terminal (FIG. 25 (c)). Although the control method of simply sending a photo according to the embodiment is described with reference to FIG. 25, an embodiment for receiving a voice input while enlarging a photo is described with reference to FIG. 26 as follows.

Figure 26:
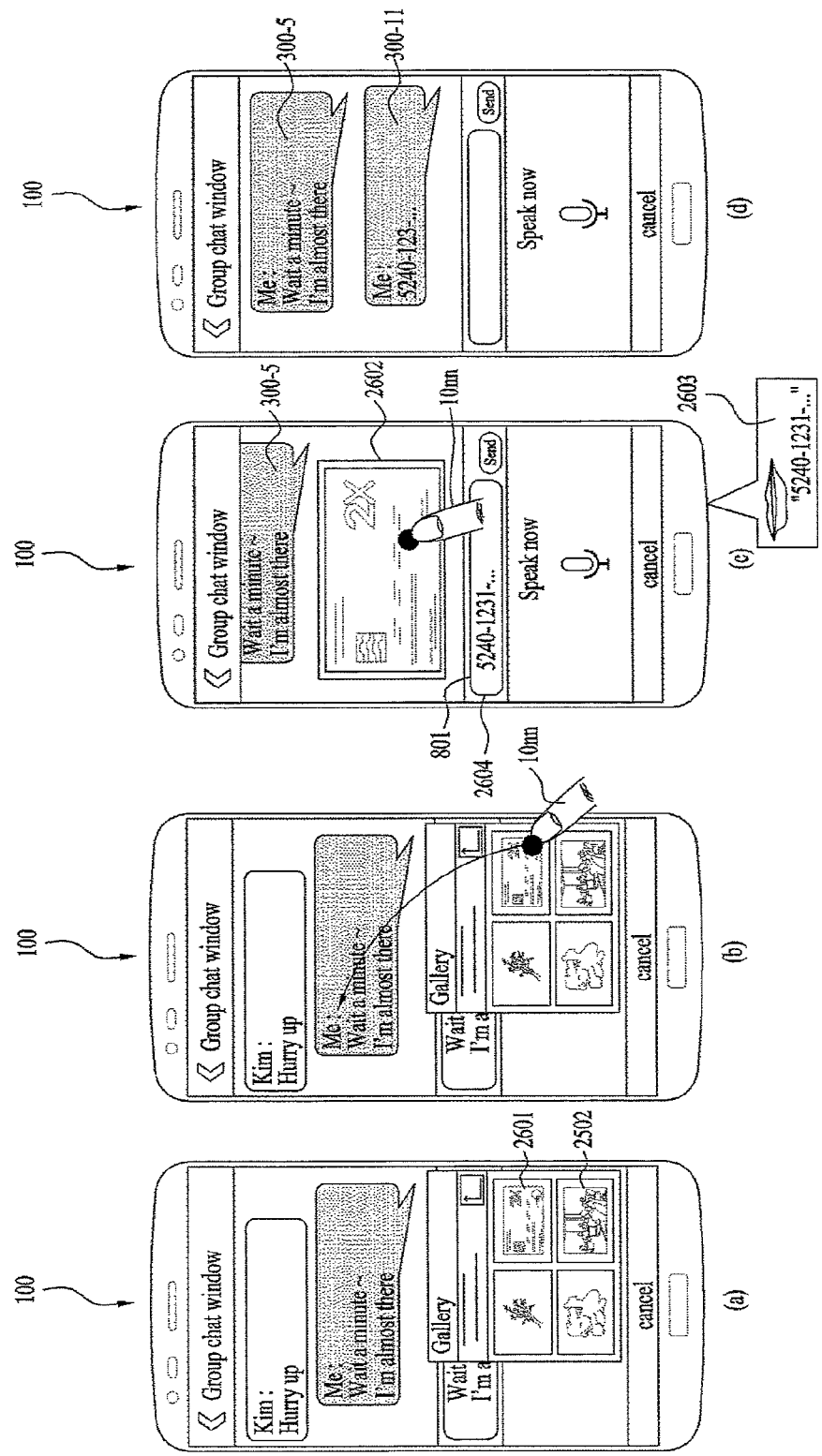
FIG. 26 is a diagram illustrating a control method of composing a message while watching a photo through an execution screen of a gallery application according to one embodiment of the present invention.

FIG. 26 is a diagram illustrating a control method of composing a message while watching a photo through an execution screen of a gallery application according to one embodiment of the present invention. Referring to FIG. 26 (a), as mentioned in the foregoing description of the embodiment with reference to FIG. 25, the execution screen of the gallery application is currently output as a popup window 2502. And, the execution screen of the gallery application contains an image thumbnail list.

After a prescribed thumbnail 2601 has been selected from the image thumbnail list, if an input 100nn for dragging the selected thumbnail 2601 to a chat window is received (FIG. 26 (b)), the controller 180 can enlarge and display an image 2602 corresponding to the selected thumbnail 2601 (FIG. 26 (c)).

Referring to FIG. 26 (c), after the touch 10nn has been dragged to the chat window, if the touch 10nn is held, the controller 180 receives a voice input 2603 from a user and can then compose a message by controlling the enlarged image 2602 to overlap the chat window. In particular, the user can input a message based on the voice input while checking the enlarged image 2602. When the user composes a text message while checking an image (e.g., when a credit card information is composed as a message), one embodiment of the present invention can be highly utilized. Moreover, if the microphone activate button 2400 is touched, the controller 180 activates a module of the microphone 122 and can then send a received voice input to a counterpart in direct. For instance, voice data can be sent to the counterpart as it is. In another instance, the received voice input is converted into a text by STT and the text can be sent to the counterpart.

The input voice input 2603 may be displayed as a text 2604 on the text input window 801 in real time. If the touch 10nn is released, referring to FIG. 26 (d), the controller 180 directly sends the message composed based on the voice input and can display the composed message as a sent message 300-11 on the chat window. According to the above-described embodiment, a control method of executing a function mapped to a prescribed voice recognition is described. In the following description, a control method of performing a search by setting a voice recognized in response to a prescribed voice recognition as a keyword is described in detail.

Figure 27:
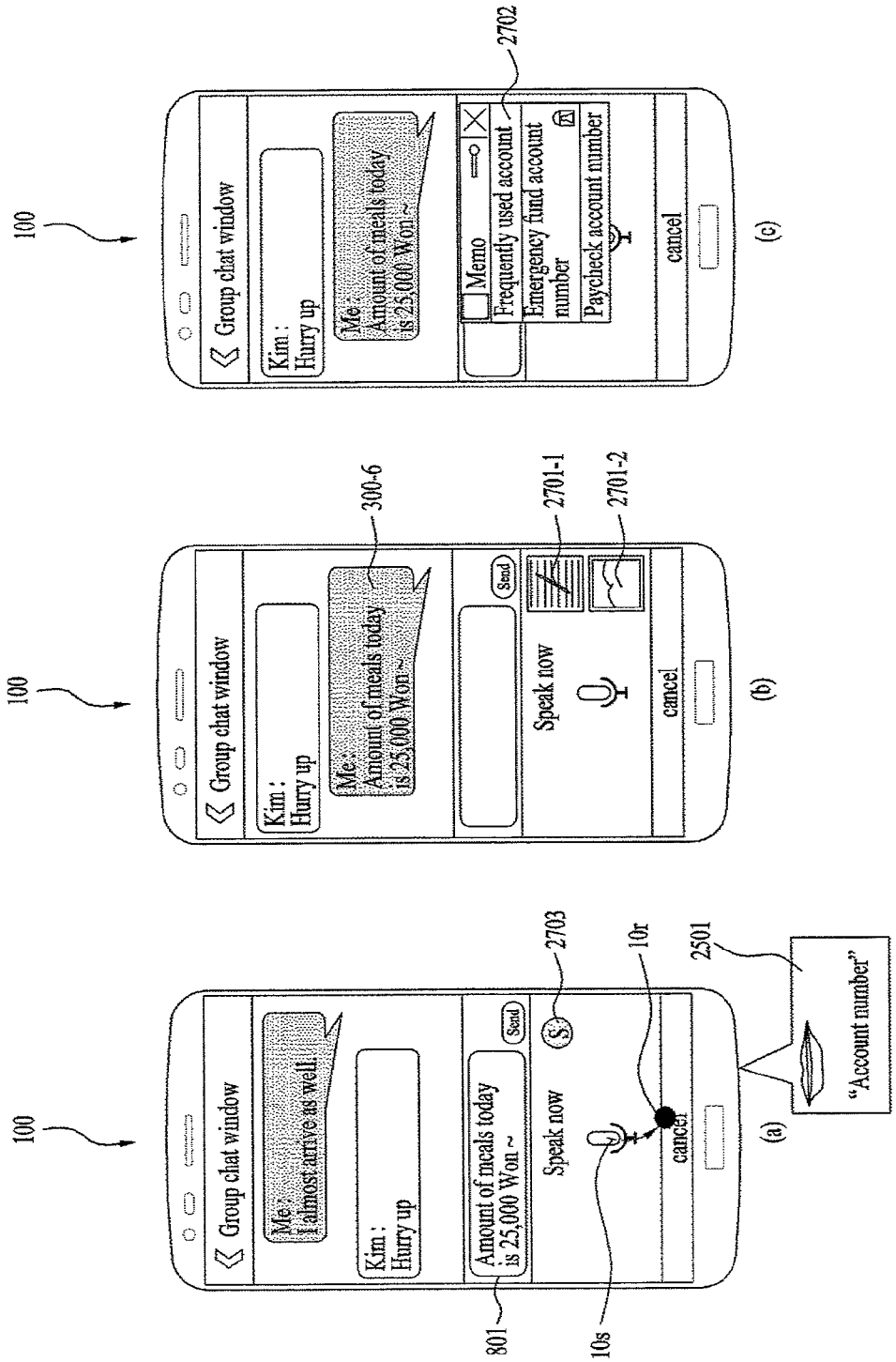
FIG. 27 is a diagram illustrating a control method of performing a search based on a recognized voice according to one embodiment of the present invention.

FIG. 27 is a diagram illustrating a control method of performing a search based on a recognized voice according to one embodiment of the present invention. According to one embodiment of the present invention, a search may have the concept that includes a complexed search related to data saved in the mobile terminal 100, an application installed on the mobile terminal 100 and the like.

Referring to FIG. 27 (a), the controller 180 currently outputs a message input window 801 together with an execution screen of a message application through the touchscreen 151. And, a prescribed message is input to the message input window 801. While a touch 10r is held on a prescribed region by a touch drag 10s and 10r, if a user's voice 2501 is input, the controller 180 can perform a search based on the input voice 2501.

Meanwhile, the controller 180 can further output a search indicator 2703 to indicate that the search is performed based on the input touch drag 10s and 10r and the user's voice 2501. Namely, the controller 180 recognizes the input voice 2501 and can then perform the search using a result of the recognition as a keyword. If a first data related to a first application and a second data related to a second application are found, referring to FIG. 27 (b), the controller 180 can output a list of icons 2701-1 and 2701-2 related to the applications.

If the first icon 2701-1 is selected, the controller 180 can further output a search list 2702 related to the first application (FIG. 27 (c)). In particular, the search result in one embodiment of the present invention is provided as two steps including an application result and a detailed result. In the following description, a control method of utilizing a search result on the search list 2702 related to the first application is described in detail with reference to FIG. 28.

Figure 28:
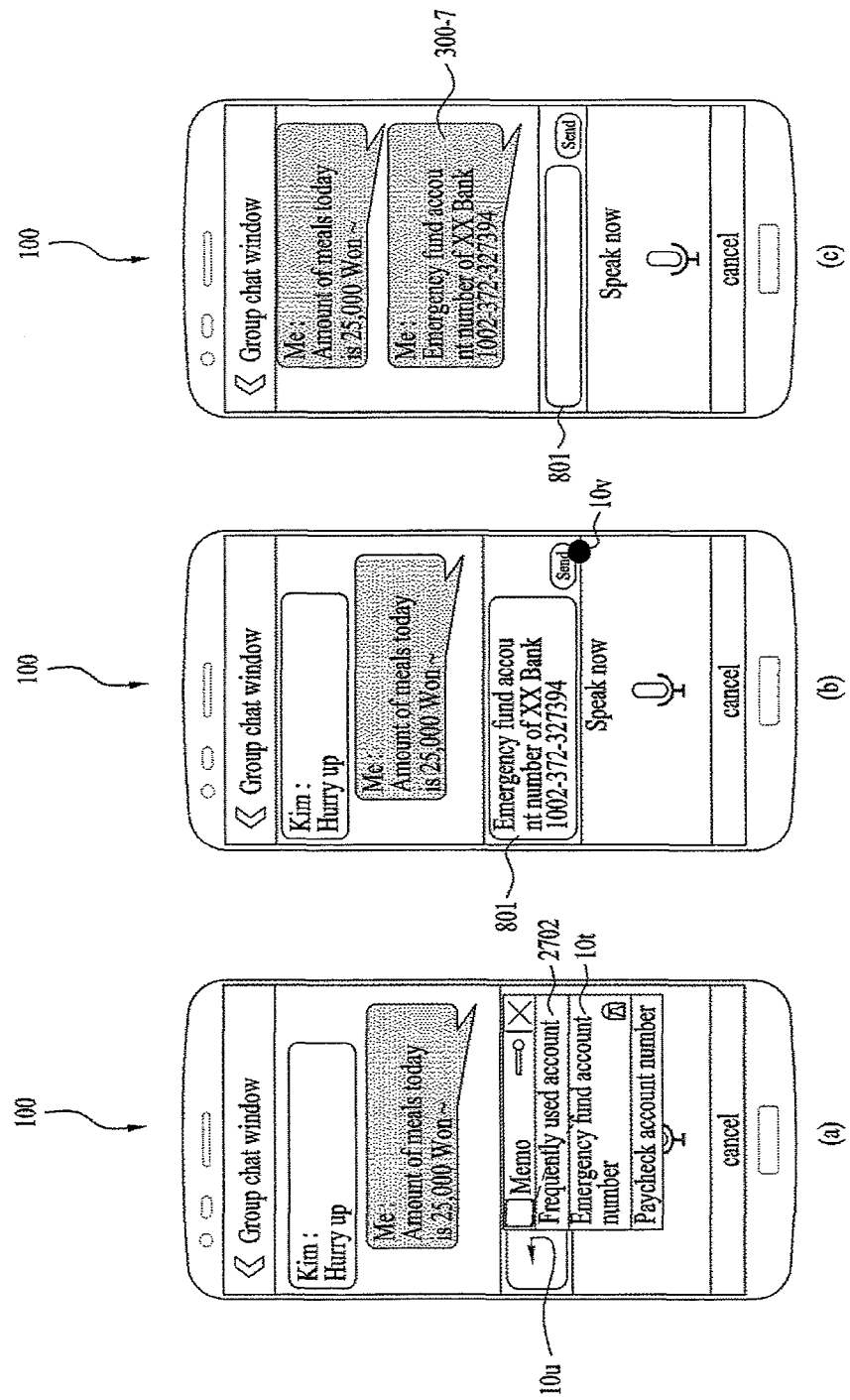
FIG. 28 is a diagram illustrating a control method of utilizing a search result based on a keyword according to one embodiment of the present invention.

FIG. 28 is a diagram illustrating a control method of utilizing a search result based on a keyword according to one embodiment of the present invention. Referring to FIG. 28 (a), the controller 180 currently outputs the search list 2702 related to the first application described with reference to FIG. 27. If an input of applying a touch 10t to a prescribed item on the search list 2702 and then applying a drag 10u to the execution screen of the message application is received, referring to FIG. 28 (b), the controller 180 can input the prescribed item of the touch 10t to the message input window 801. If a message send input 10v is received, referring to FIG. 28 (c), the controller 180 sends the message and can display the sent message as a sent message 300-7 on the transceived message history.

Figure 29:
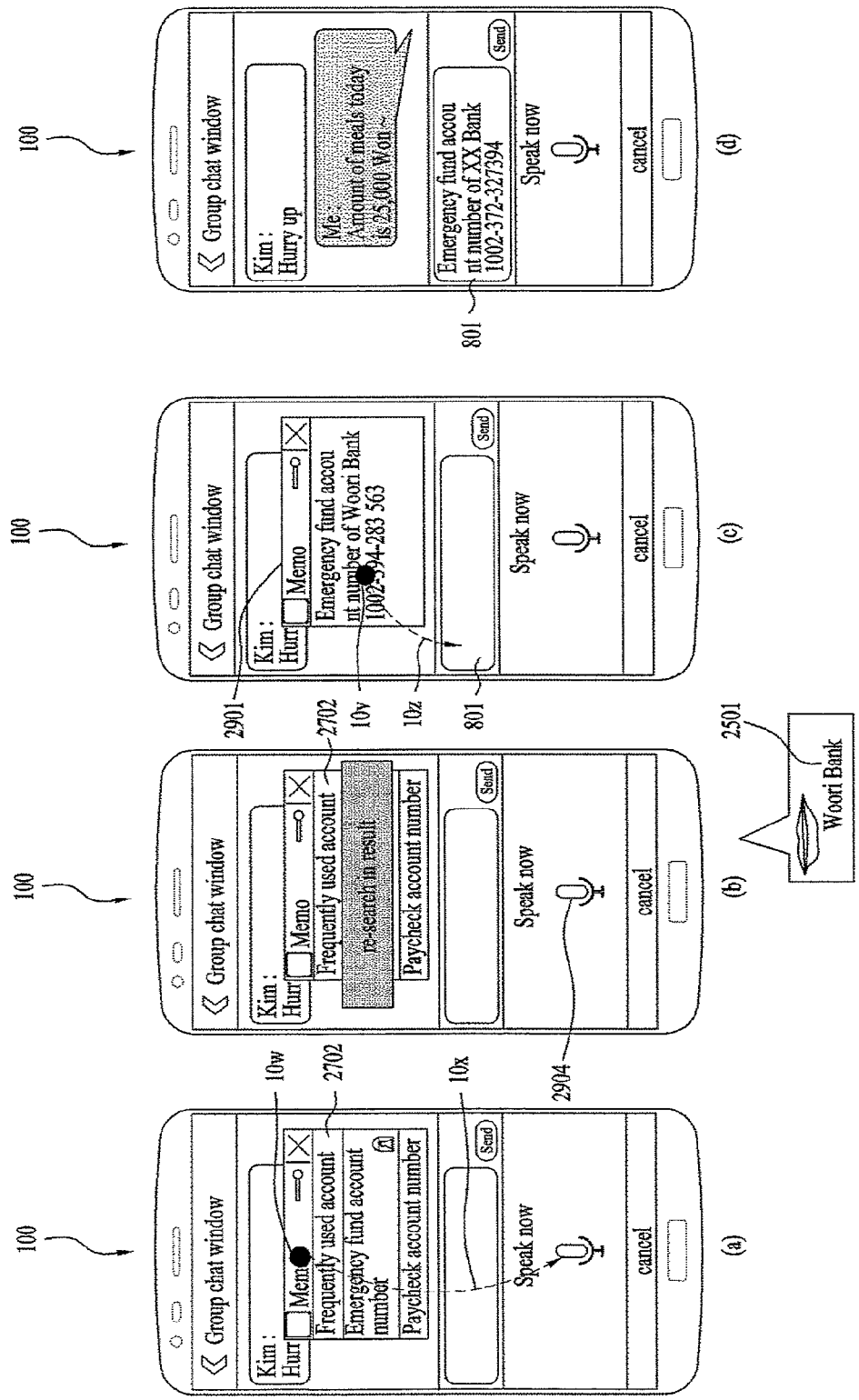
FIG. 29 and FIG. 30 are diagrams illustrating a control method of performing a search on a search list again according to one embodiment of the present invention.
Figure 30:
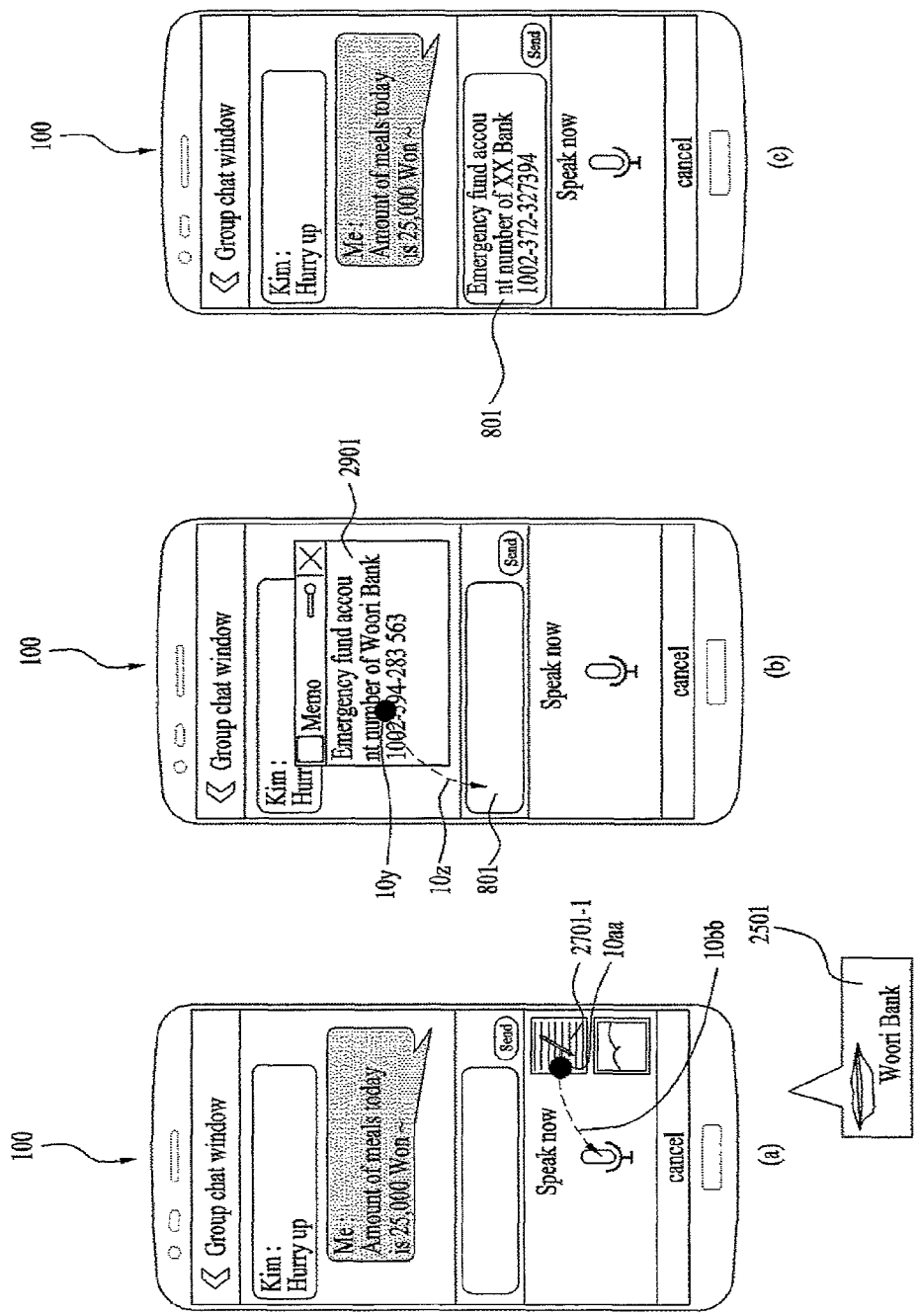

A control method of performing the search again in the result is described in detail with reference to FIG. 29 as follows. In particular, FIG. 29 and FIG. 30 are diagrams illustrating a control method of performing a search on a search list again according to one embodiment of the present invention. Referring to FIG. 29 (a), the controller 180 currently outputs the search list 2702 related to the first application described with reference to FIG. 27. If a touch gesture 10w and 10x is applied to the search list 2702, referring to FIG. 29 (b), the controller 180 can perform a re-search on the search list 2702. In this instance, the touch gesture 10w and 10x may include a gesture performed by applying a touch 10w to a top end of the search list 2702 and then applying a drag 10x to the microphone activate icon by holding the touch 10w.

Thus, if a re-search is performed within the result, according to one embodiment of the present invention, as shown in FIG. 29 (b), the controller 180 can indicate the re-search by displaying a popup window 2903 indicating the re-search or changing a size or color of the microphone indicator 2404.

Referring to FIG. 29 (c), the re-search result may be output as a popup window 2901. If a touch 10y to the re-search result is applied and a drag 10z to the execution screen of the message application is then applied, referring to FIG. 29 (d), the controller 180 can input the re-search result to the text input window 801.

Referring to FIG. 30 (a), as mentioned in the foregoing description with reference to FIG. 27, the search result is output as a list of the icons 2701-1 and 2701-2. After a touch gesture 10aa and 10bb of selecting the first icon 2701-1 from the output list and dragging the selected icon to the microphone activate button has been received, if a voice 2501 is received from a user, the controller 180 can perform a re-search on the search result based on the voice 2501.

Like the former embodiment described with reference to FIG. 29, the re-search result may be output as a popup window 2901. If a touch 10y to the re-search result and a drag 10z to the execution screen of the message application are applied (FIG. 30 (b)), the controller 180 can input the re-search result to the text input window 801 (FIG. 30 (c)).

Meanwhile, when text messages are exchanged with a counterpart, it may happen that a schedule needs to be registered or that an input f a memo is requested. According to one embodiment of the present invention, it is intended to provide a control method of facilitating an access to a schedule registration or memo function on a message transceiving application.

Figure 31:
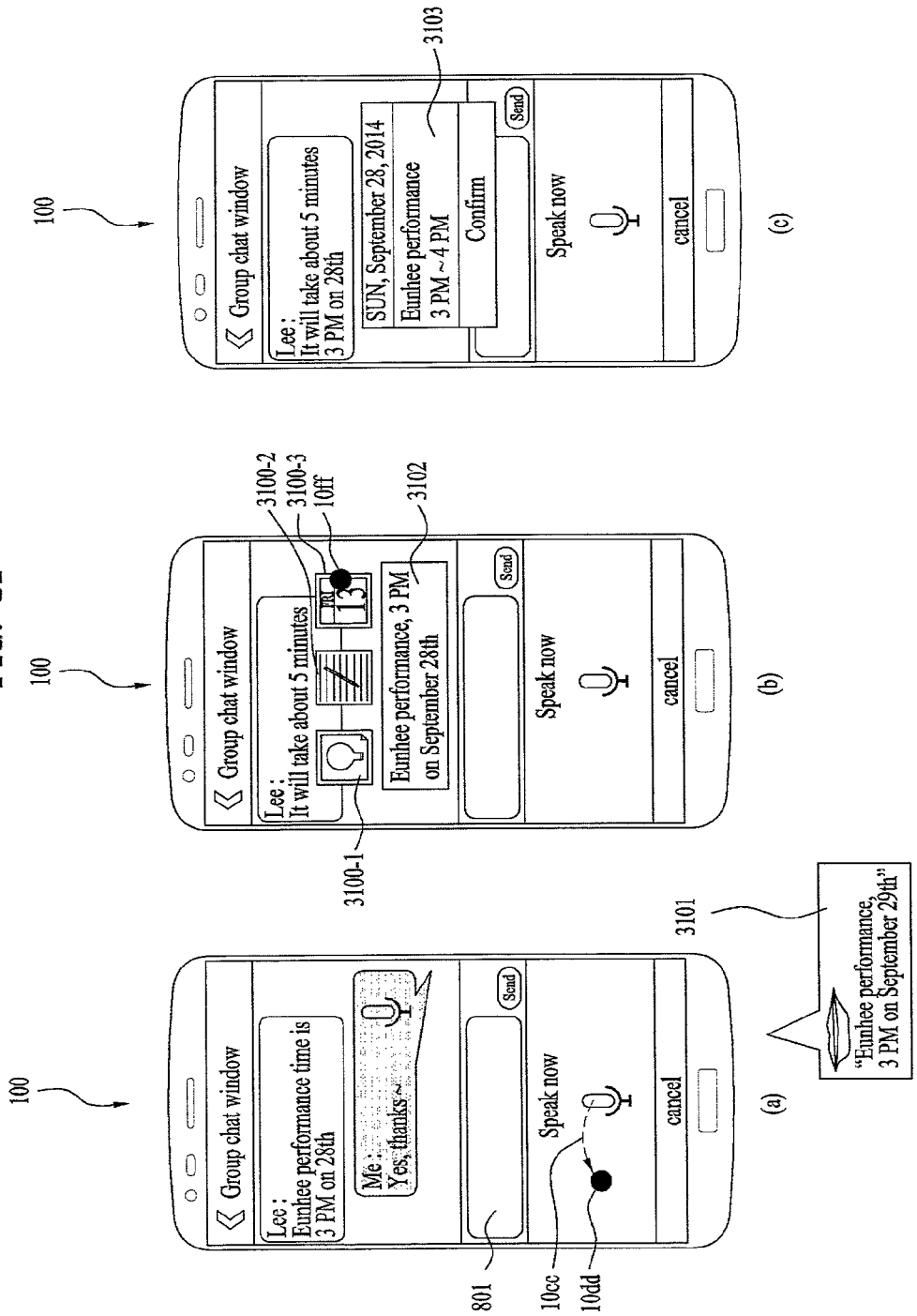
FIG. 31 is a diagram illustrating a control method of outputting a list of recommended applications based on a voice input received from a user according to one embodiment of the present invention.

FIG. 31 is a diagram illustrating a control method of outputting a list of recommended applications based on a voice input received from a user according to one embodiment of the present invention. Referring to FIG. 31 (a), illustrated is a state that messages are exchanged between a user and a counterpart through a message application. After a touch 10cc to the microphone activate button has been applied, if a drag 10dd is applied by holding the touch 10cc, the controller 180 can receive a voice 3101 from a user. Together with a result 3102 of the recognition of the received voice 3101, the controller 180 searches for an appropriate application based on the recognized voice 3101 and can output a recommended application list 3100 (FIG. 31 (b)).

If a prescribed application icon 3100-3 is selected from the application list 3100, the controller 190 automatically adds a schedule related to the recognized voice to the selected application and can indicate a result of the addition through a popup window 3103 (FIG. 31 (c)). Meanwhile, a voice recognition may have a disadvantage in representing an emoticon, a symbol and the like. Therefore, according to one embodiment of the present invention described in the following description, proposed is a control method of inputting an emoticon or symbols based on a voice recognition.

Figure 32:
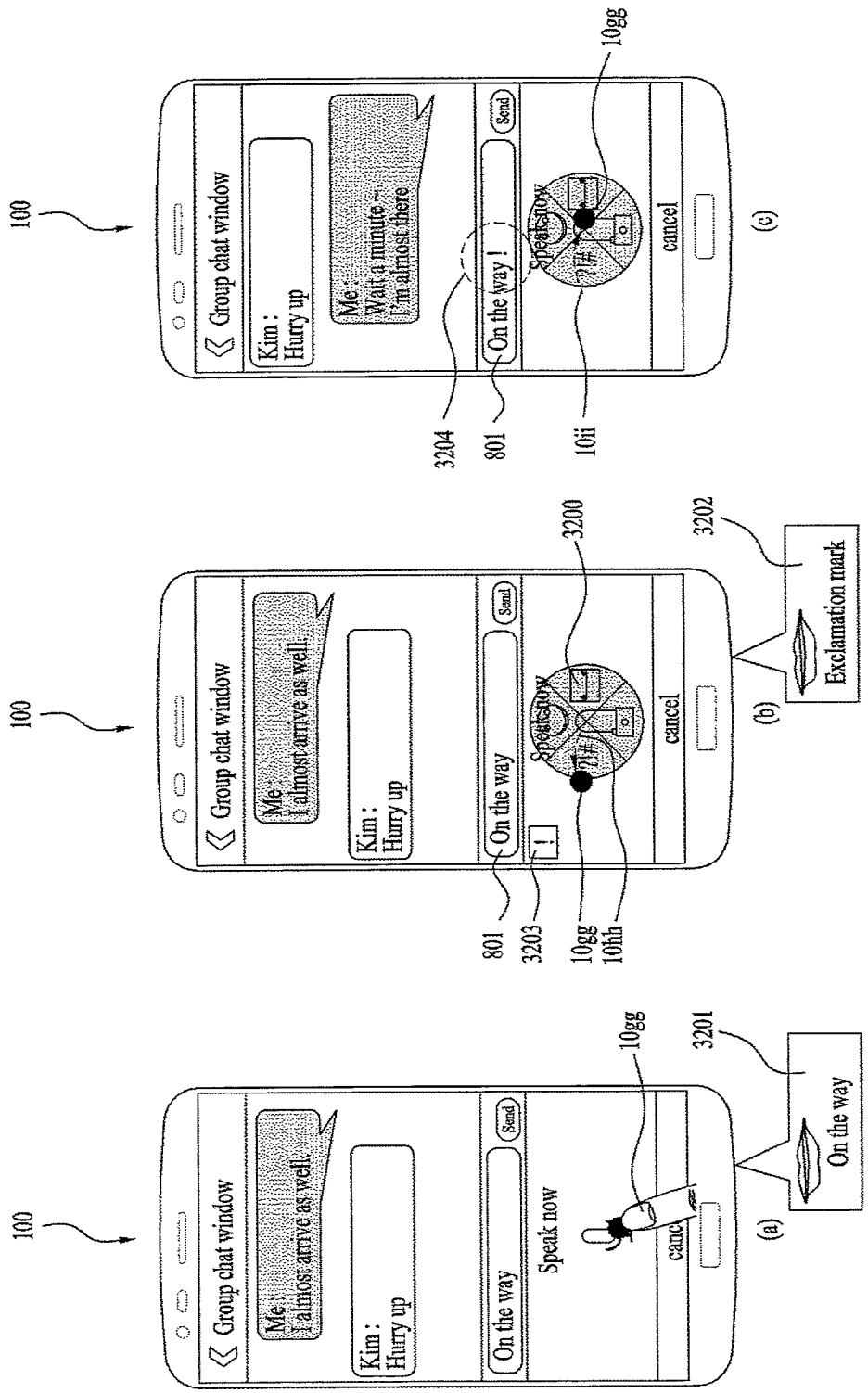
FIG. 32 is a diagram illustrating a control method of inputting an emoticon based on a user's voice recognition and a user's touch gesture according to one embodiment of the present invention.

FIG. 32 is a diagram illustrating a control method of inputting an emoticon based on a user's voice recognition and a user's touch gesture according to one embodiment of the present invention. Referring to FIG. 32 (a) and FIG. 32 (b), illustrated is a state that a prescribed message is input to a message input window 801, which is displayed on an execution screen of a message application, based on a first voice 3201.

If a user applies a drag 10hh by holding a touch 10gg to a microphone activate button, the controller 180 can further output an assistance menu 3200 for assisting a voice recognition. In the assistance menu 3200, a left region '?!#' is a region for inputting symbols. In particular, according to the embodiment of the present invention related to FIG. 32, a voice input, which is applied when the touch 10gg has been dragged to the region for inputting symbols, is proposed to be applied by searching for a symbol mapped to the voice input and then inputting the found symbol instead of being applied by being converted into a text. For instance, while the drag 10hh is not performed yet, if a voice input 'exclamation mark' is received, the controller 180 coverts the voice input into a text and can then input the text 'exclamation mark' intact. Further, after the touch 10gg has been dragged to move to the left region by the drag 10hh, if the voice input 'exclamation mark' is received, the controller 180 searches for a symbol mapped to the voice input and can then input the symbol '!'.

If a second voice 3202 is received, the controller 180 searches for a symbol based on the received second voice 3202 and can then output the found symbol 3203 (FIG. 32 (b)). If a drag 10ii to an original location (e.g., a center part of the assistance menu 3200) is applied by holding the touch 10gg, the controller 180 can input the found symbol to the text input window 801 (3204) (FIG. 32 (c)).

Figure 33:
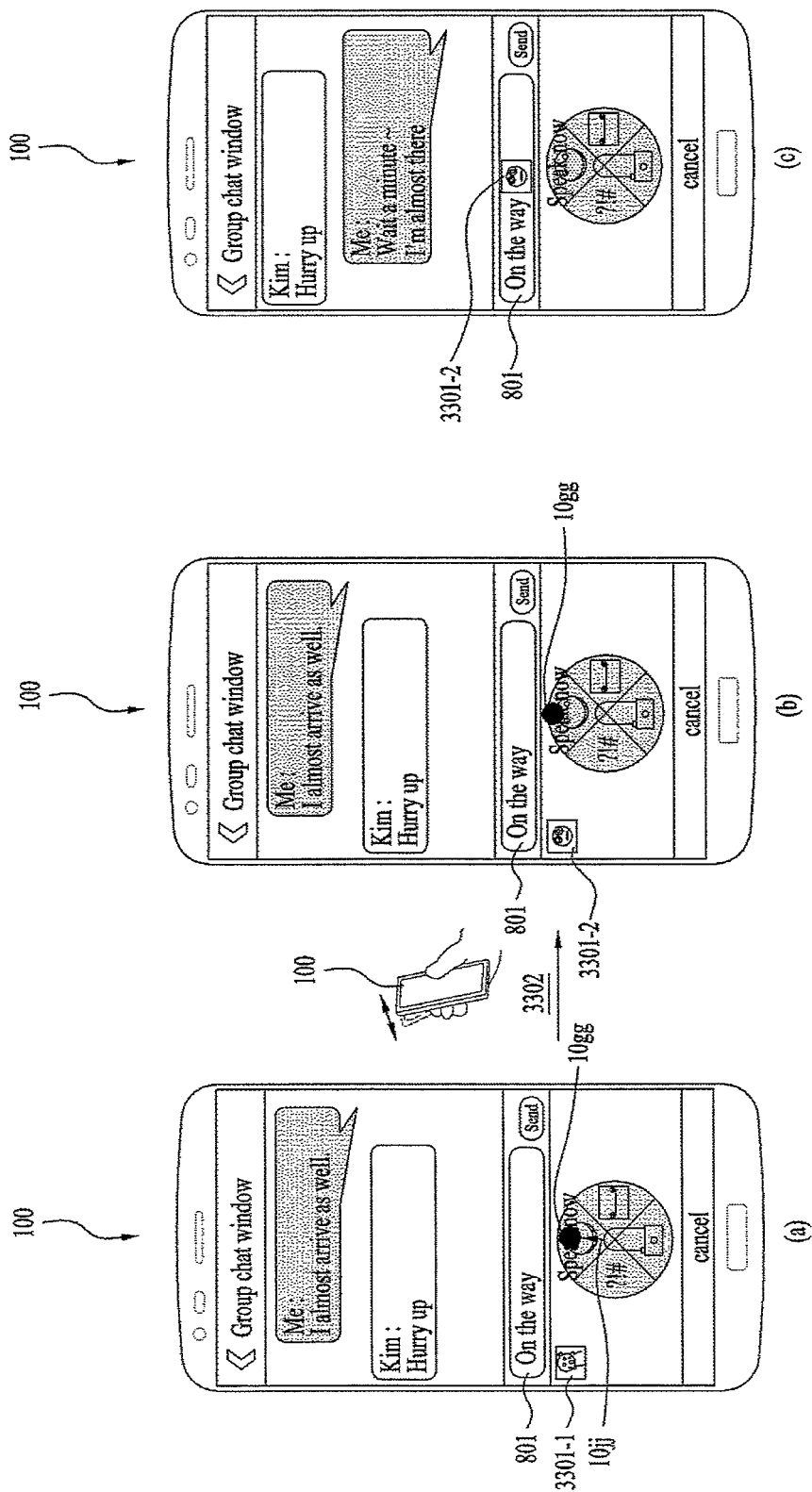
FIG. 33 is a diagram illustrating a control method of inputting an emoticon based on a user's touch gesture and a user's shaking gesture according to one embodiment of the present invention.

A control method of inputting an emoticon is described in detail with reference to FIG. 33 as follows. FIG. 33 is a diagram illustrating a control method of inputting an emoticon based on a user's touch gesture and a user's shaking gesture according to one embodiment of the present invention. Since it is difficult to input an emoticon by a voice recognition only, according to one embodiment of the present invention, the controller 180 is configured to input an emoticon by combining a touch gesture and a shaking gesture with each other.

Referring to FIG. 33 (*a*), the aforementioned assistance menu 300 is currently output and an emoticon input region is displayed on a top region of the assistance menu 300. When a location of a touch 10gg is moved to the emoticon region in response to a touch and drag 10gg and 10jj, as shown in FIG. 33 (*a*), the controller 180 can output a first emoticon 3301-1.

While the touch 10gg is held, if an input 3302 of shaking the mobile terminal 100 is received, referring to FIG. 33 (*b*), the controller 180 switches the output first emoticon 3301-1 to a second emoticon 3301-2 and can then output the second emoticon 3301-2. If the touch 10gg is released, referring to FIG. 33 (*c*), the controller 180 can input the second emoticon 301-2 to the text input window 801.

According to the embodiment mentioned in the above description, the left region and the top region are described only. If a drag to a bottom region is applied by a touch drag input, an image saved in a gallery may be attached. If a drag to a right region is applied by a touch drag input, a video saved in a gallery may be further attached.

Meanwhile, according to another embodiment of the present invention, a control method of activating a camera and inputting a text or emoticon based on an image received through the activated camera is further proposed. Such embodiments are described in detail with reference to FIG. 34 and FIG. 35 as follows.

Figure 34:
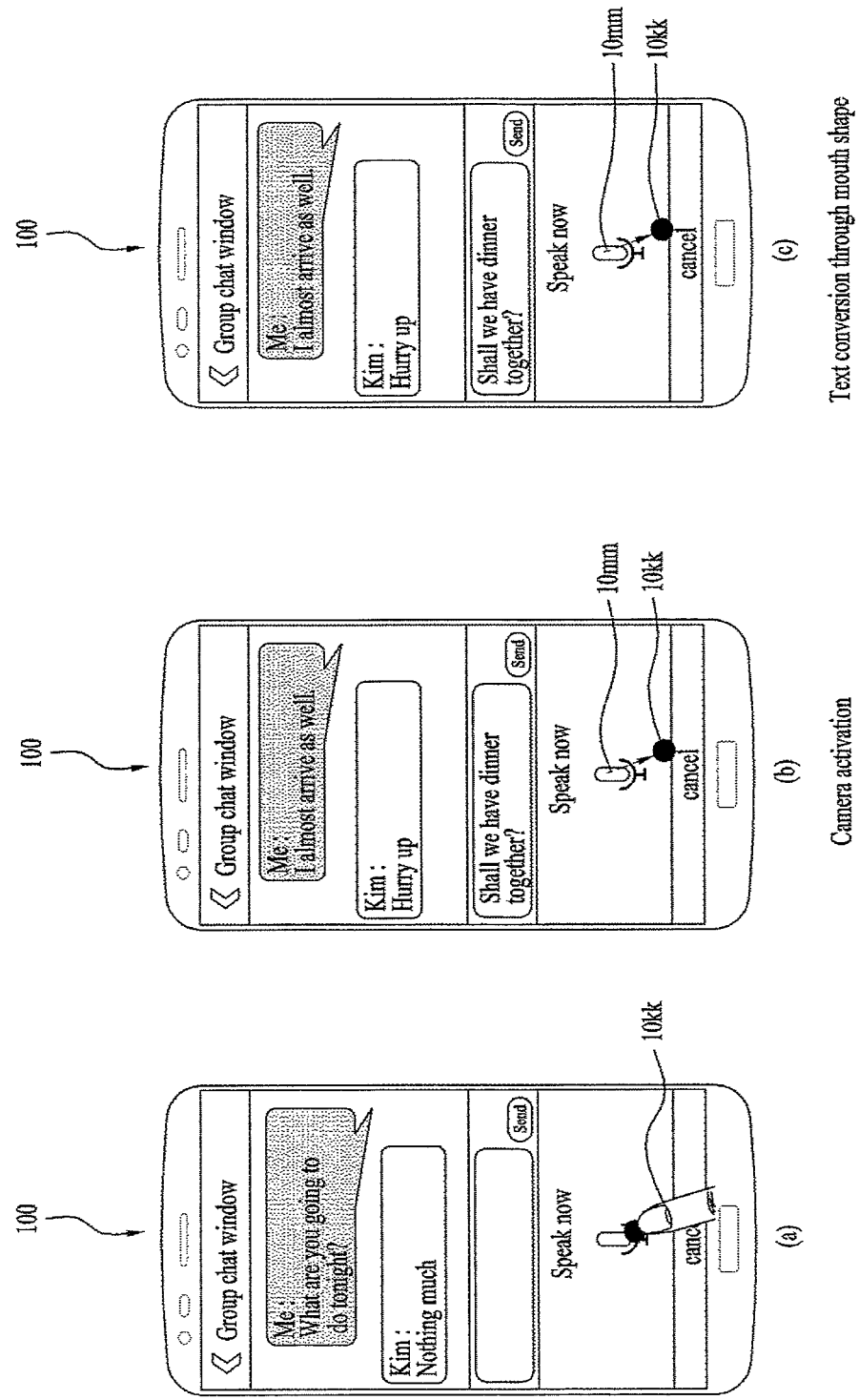
FIG. 34 is a diagram illustrating a control method of activating a camera and inputting a message through an analysis of a user's mouth shape using the activated camera according to one embodiment of the present invention.

FIG. 34 is a diagram illustrating a control method of activating a camera and inputting a message through an analysis of a user's mouth shape using the activated camera according to one embodiment of the present invention. Referring to FIG. 34 (*a*), the controller 180 currently outputs an execution screen of a message transceiving application. And, an input of applying a touch 10kk to a microphone activate button is received.

While the touch 10kk is held, if a drag 10mm is applied in a preset direction (e.g., a bottom direction), referring to FIG. 34 (*b*), the controller 180 activates the camera 121 and then analyzes a user's mouth shape using an image received through the activated camera 121. Subsequently, referring to FIG. 34 (*c*), based on a result of the analysis, the controller 180 can input a prescribed text data to the message input window 801 in real time. According to the above-described embodiment, the mouth shape is analyzed only. Moreover, an embodiment for recommending an emoticon by analyzing a face expression of a user is possible as well. Such an embodiment for recommending an emoticon is described in detail with reference to FIG. 35 as follows.

Figure 35:
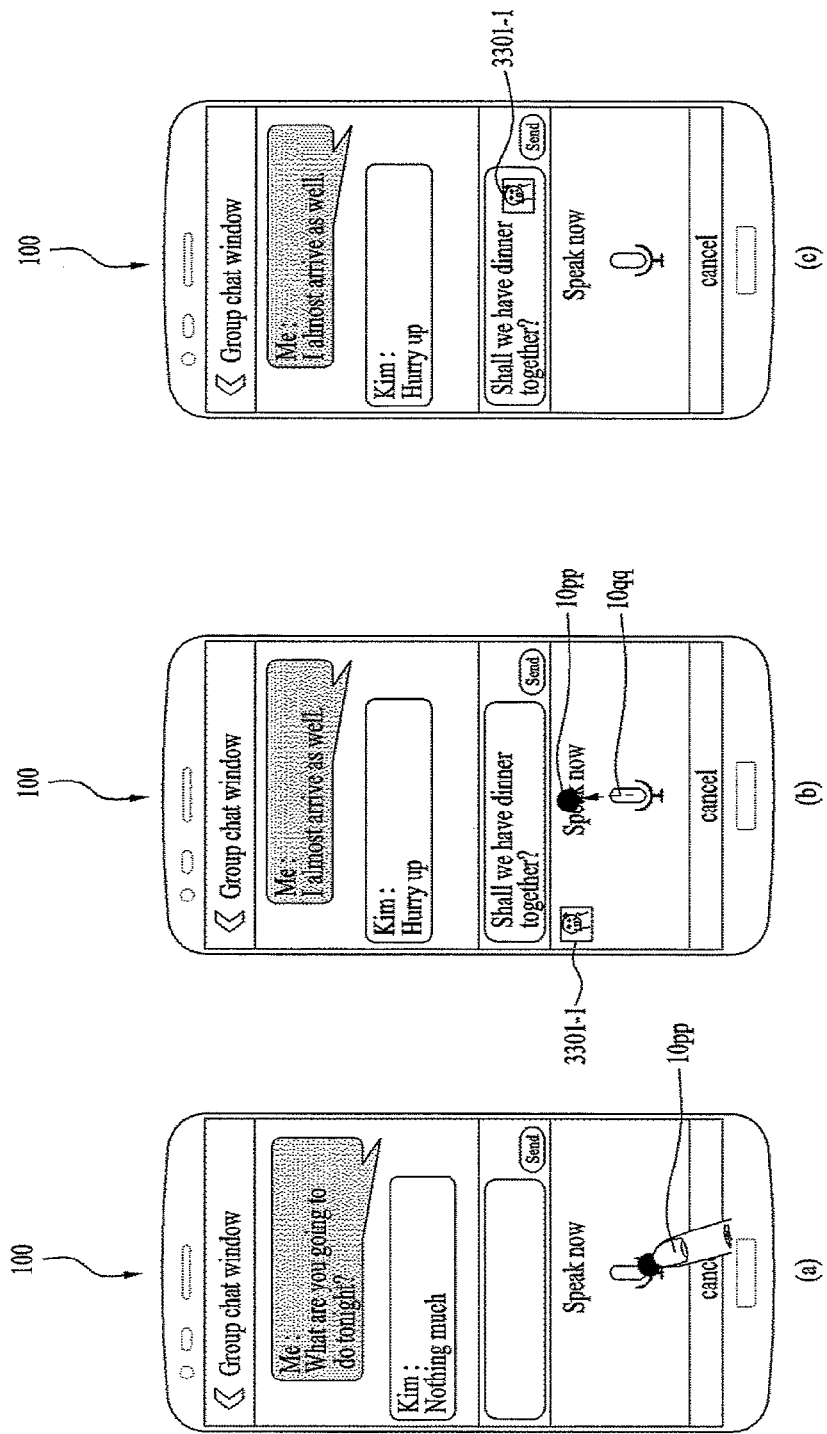
FIG. 35 is a diagram illustrating a control method of activating a camera and inputting an emoticon through a user's facial expression analysis using the activated camera according to one embodiment of the present invention.

FIG. 35 is a diagram illustrating a control method of activating a camera and inputting an emoticon through a user's facial expression analysis using the activated camera according to one embodiment of the present invention. Referring to FIG. 35 (*a*), the controller 180 currently outputs an execution screen of a message transceiving application. And, an input of applying a touch 10pp to a microphone activate button is received.

While the touch 10pp is held, if a drag 10qq is applied in a preset direction (e.g., a top direction), referring to FIG. 35 (*b*), the controller 180 activates the camera 121 and then analyzes a facial expression of a user using an image received through the activated camera 121. If the touch 10pp is released, referring to FIG. 35 (*c*), the controller 180 can input a prescribed emoticon 3301-1 to the message input window 801.

Meanwhile, according to one embodiment of the present invention, a following control method is proposed. First of all, when a message is received, the received message is automatically converted into an audio data by TTS. Secondly, the audio data is output.

Figure 36:
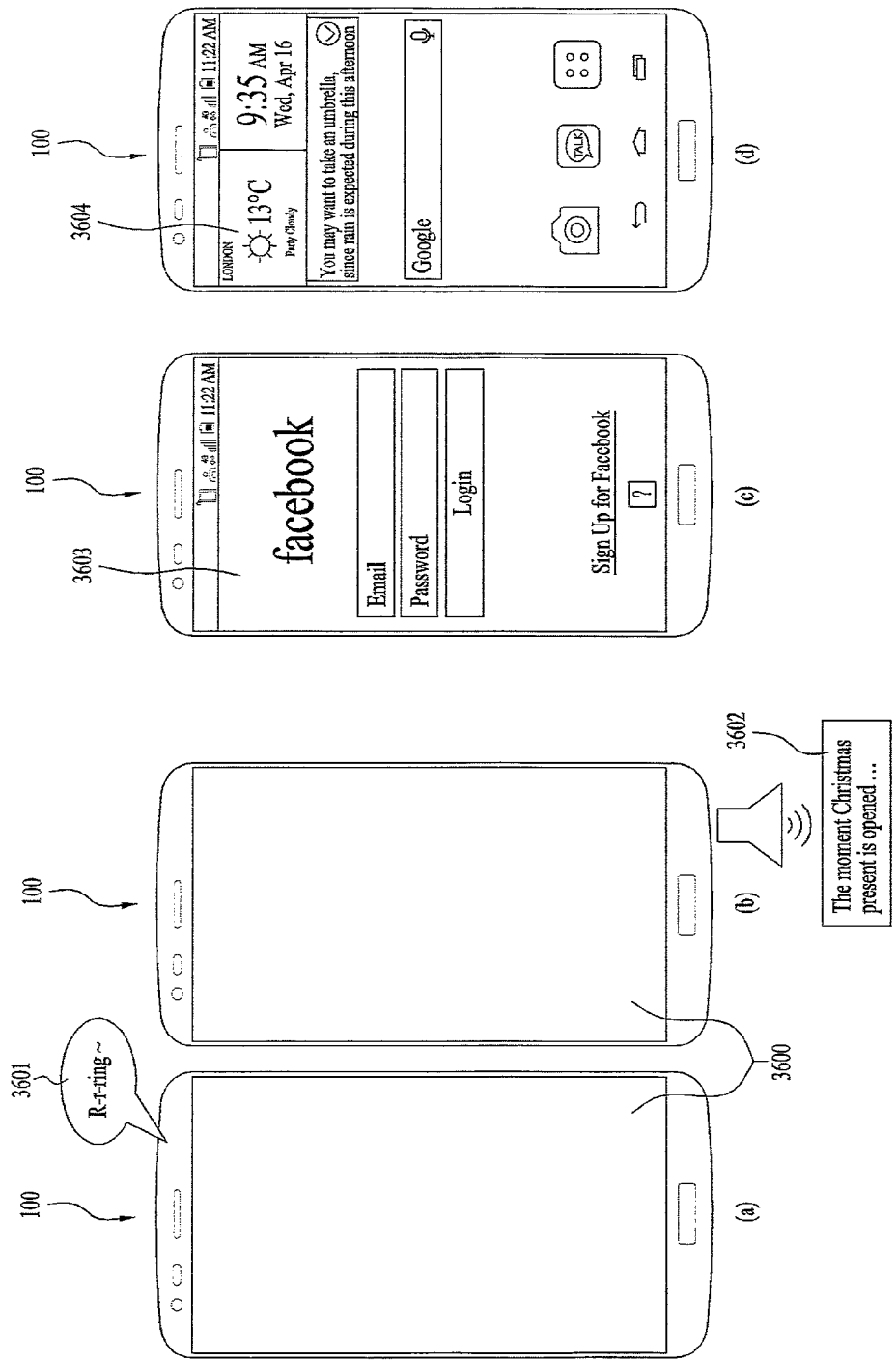
FIG. 36 is a diagram illustrating a control method of notifying a received message by converting it into an audio output according to one embodiment of the present invention.

FIG. 36 is a diagram illustrating a control method of notifying a received message by converting it into an audio output according to one embodiment of the present invention. According to one embodiment of the present invention, after a message has been received, if an ear proximity gesture is detected, the controller 180 is configured to indicate a content of the received message by audio voice conversion (e.g., Speech to Text (STT)). In this instance, as mentioned in the foregoing description, the ear proximity gesture means a gesture of holding the mobile terminal 100 to a user's ear.

Referring to FIG. 36 (*a*), the mobile terminal 100 currently outputs a standby screen 3600. If a prescribed message is received, it can output a notification 3601 indicating the reception of the message. In this instance, the notification 3601 can be performed by outputting a preset notification sound through the audio output unit 152 of the mobile terminal 100 or a preset vibration pattern through the haptic module 153 of the mobile terminal 100.

If a user takes the ear proximity gesture, the controller 180 converts a content of the received message into an audio output 3602 by STT and can then output the audio output 3602 through the audio output unit 152 (FIG. 36 (*b*)). Meanwhile, it can output a different screen depending on whether a lock screen is unlocked within a prescribed time with reference to a timing point of receiving the message or a timing point of outputting the converted audio.

When the lock screen is unlocked within the prescribed time, referring to FIG. 36 (*c*), it can directly enter an execution screen 3603 of the corresponding message received application. If the lock screen is unlocked after an elapse of the prescribed time, referring to FIG. 36 (*d*), the controller 180 can enter a home screen 3604 irrespective of the received prescribed message.

Figure 37:
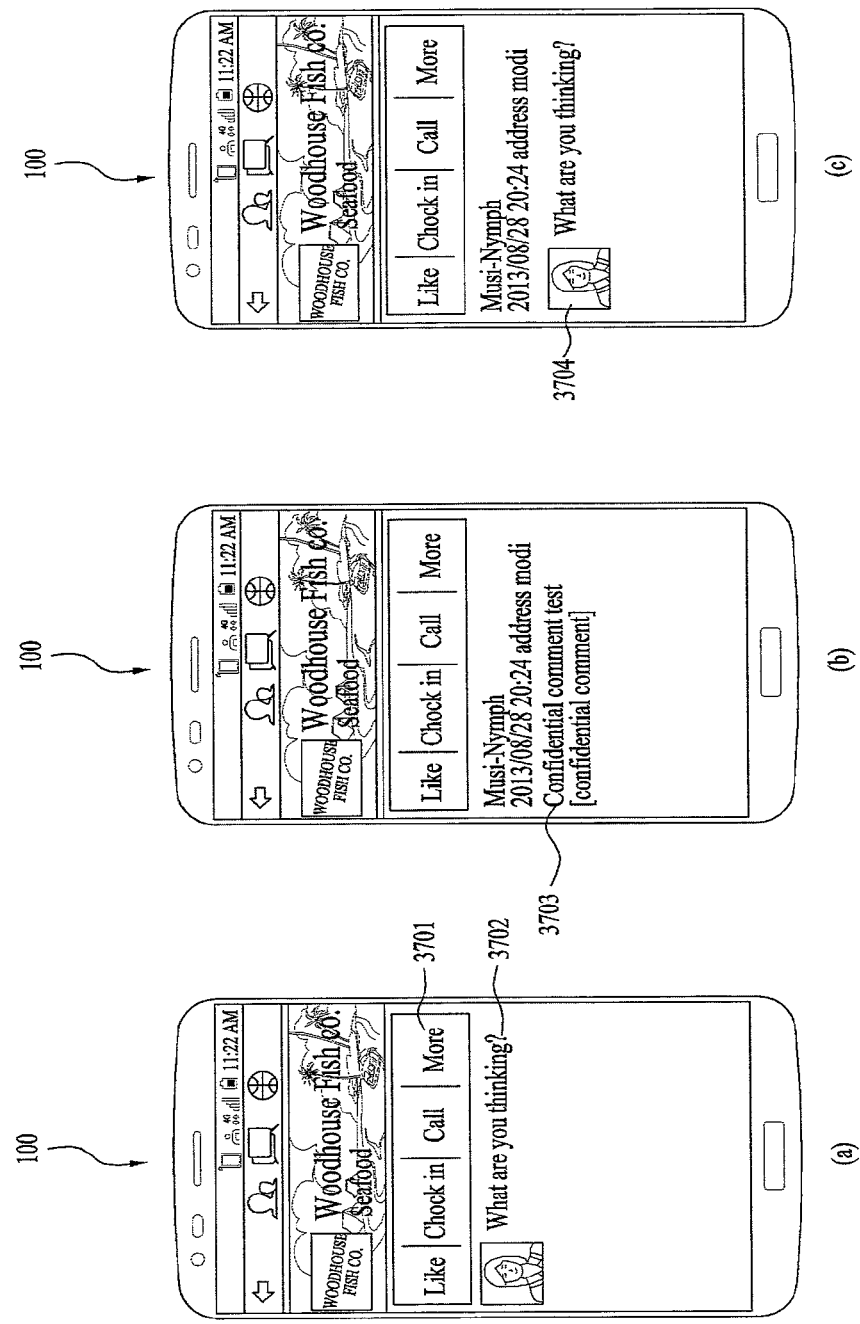
FIG. 37 is a diagram illustrating a control method of differentiating an attribute of a composed message depending on a state of a mobile terminal 100 in case of inputting a voice through a microphone 122 according to one embodiment of the present invention.

According to the description related to FIG. 37, explained is a control method of differentiating an attribute of a composed message depending on a state of the mobile terminal 100 in case of inputting a voice through the microphone 122. In particular, FIG. 37 is a diagram illustrating a control method of setting a message attribute in case of composing a message using a social network service according to one embodiment of the present invention. Referring to FIG. 37 (*a*), the controller 180 currently outputs an execution screen 3701 of a prescribed social network service application through the touchscreen 151. And, a message input window 3702 may be included in the execution screen 3701.

When the mobile terminal 100 is in a first state (e.g., a state that the mobile terminal 100 is held to a user's ear), if a voice input is applied, the controller 180 can apply a first setting to a composed message. Likewise, when the mobile terminal 100 is in a second state (e.g., a state that a user is watching a screen of the mobile terminal 100), if a voice input is applied, the controller 180 can apply a second setting to a composed message.

One example of the first/second setting may include a presence or non-presence of confidential/public writing. In particular, if a voice input is received in the first state, referring to FIG. 37 (b), the controller 180 can sets a composed message to a confidential writing 3703 and can then post it. Further, if a voice input is received in the second state, referring to FIG. 37 (c), the controller 180 can sets a composed message to a public writing 3704 and can then post it.

Meanwhile, according to another embodiment of the present invention, when a message is read, the controller 180 is configured to determine whether a message content is included in accordance with a presence or non-presence of user authentication. Such an embodiment is described in detail with reference to FIG. 38 and FIG. 39 as follows.

FIG. 38 is a diagram illustrating one example of reading a message in case of a success in user authentication according to one embodiment of the present invention. In this instance, as mentioned in the foregoing description, 'reading a message' means that a message is converted into a voice output using TTS.

According to one embodiment of the present invention, the user authentication can be performed in various ways. According to the example shown in the drawing, it can perform the user authentication based on whether an authentication process with another external terminal 100-2 is performed. This method has the following advantage. First of all, when the external terminal 100-2 is a wearable mobile terminal, assuming that the external terminal 100-2 is worn on a body of a user, the reliability of the user authentication can be increased. In particular, according to one embodiment of the present invention, depending on whether the mobile terminal 100-1 has performed the authentication process 3801 with the external terminal 100-2, the user authentication of the mobile terminal 100 can be performed.

Thus, if a received message exists in a user authenticated state, according to one embodiment of the present invention, the controller 180 is configured to read a content of the received message as well. Referring to FIG. 38 (a), the mobile terminal 100-1 outputs a notification 3601 on a received message.

After the notification 3601 has been output, if an ear proximity gesture is received, the controller 180 can provide a first output 3801 by converting the received message into a voice including a message content irrespective of a type of the received message (FIG. 38 (b)). According to one embodiment of the present invention, after the notification 3601 has been output, while a touch 10uu is applied to the touchscreen 151, if an ear proximity gesture is received, the controller 180 is configured to read a received message per application. In particular, if an ear proximity gesture is detected when the touch 10uu is applied to the touchscreen 151, the controller 180 converts a message received through a prescribed application into a voice by TTS and can then output the voice (FIG. 38 (c)).

One embodiment of reading a message in case of failing to perform a user authentication is described in detail with reference to FIG. 39 as follows. FIG. 39 is a diagram illustrating one example of informing a user of a received message in case of incompletion of a user authentication according to one embodiment of the present invention. Yet, in FIG. 39, if an ear proximity gesture is received, a received message is distinguishably output depending on whether a touch input is currently applied to the touchscreen 151.

Referring to FIG. 39 (a), the mobile terminal 100-1 outputs a notification 3601 on a received message. After the notification 3601 has been output, if an ear proximity gesture is received without any touch input to the touchscreen 151, the controller 180 can output a text 3901 indicating the number of received messages irrespective of types of the received messages (FIG. 39 (b)). After the notification 3601 has been output, if an ear proximity gesture is received while inputting a touch 10vv to the touchscreen 151, the controller 180 can output a text 3902 indicating the number of messages for each message type (FIG. 39 (c)).

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
    a touchscreen;
    a wireless communication unit; and
    a controller configured to:
    display a group chat window on the touchscreen including a history of messages transceived via the wireless communication unit with a plurality of counterpart terminals,
    in response to a touch input to a message received from a prescribed counterpart terminal, select the prescribed counterpart terminal for transmitting a private message to the prescribed counterpart terminal, wherein the message received from the prescribed counterpart terminal is included in the history of messages,
    in response to a gesture input, generate an input message by converting a voice input through a microphone of the mobile terminal into text, wherein the gesture input is a gesture that releases the touch input and raises the mobile terminal, and
    transmit the generated input message as the private message to the prescribed counterpart terminal without switching to an individual chat window with the prescribed counterpart terminal.

2. The mobile terminal of claim 1, wherein the controller is further configured to display, on the touchscreen, the private message transmitted to the prescribed counterpart terminal together with the history of messages included in the group chat window.

3. The mobile terminal of claim 1, wherein the controller is further configured to identifiably display the private message transmitted to the prescribed counterpart terminal in the group chat window.

4. The mobile terminal of claim 1, wherein the controller is further configured to:
receive, via the wireless communication unit, a private message from the prescribed counterpart terminal intended for the mobile terminal and not the other counterpart terminals in the group chat window, and
display the received private message on the touchscreen received from the prescribed counterpart terminal in the group chat window.

5. The mobile terminal of claim 4, wherein the controller is further configured to display a voice indicator with the received private message indicating the received private message was input by voice from a user of the prescribed counterpart terminal.

6. The mobile terminal of claim 1, wherein the controller is further configured to:
display a text input window for inputting the message with the group chat window,
receive a touch input of a prescribed transceived message included in the history of messages and a drag input to the text input window, and
display a graphic object indicating the prescribed counterpart terminal corresponding to the touched prescribed transceived message.

7. The mobile terminal of claim 6, wherein the controller is further configured to identifiably display the prescribed transceived message.

8. The mobile terminal of claim 1, wherein the controller is further configured to:
receive a touch and scroll input of a prescribed transceived message included in the history of messages, and
display messages related to the touched prescribed transceived message in a group as being overlaid on the messages transceived with the plurality of counterpart terminals.

9. A method of controlling a mobile terminal, the method comprising:
displaying, via a touchscreen, a group chat window including a history of messages transceived via a wireless communication unit with a plurality of counterpart terminals;
in response to a touch input to a message received from a prescribed counterpart terminal, selecting, via a controller, the prescribed counterpart terminal for transmitting a private message to the prescribed counterpart terminal, wherein the message received from the prescribed counterpart terminal is included in the history of messages;
in response to a gesture input, generating, via the controller, an input message by converting a voice input through a microphone of the mobile terminal into text, wherein the gesture input is a gesture that releases the touch input and raises the mobile terminal; and
transmitting, via the wireless communication unit, the generated input message as the private message to the prescribed counterpart terminal without switching to an individual chat window with the prescribed counterpart terminal.

10. The method of claim 9, further comprising:
displaying, on the touchscreen, the private message transmitted to the prescribed counterpart terminal together with the history of messages included in the group chat window.

11. The method of claim 9, further comprising:
identifiably displaying the private message transmitted to the prescribed counterpart terminal in the group chat window.

12. The method of claim 9, further comprising:
receiving, via the wireless communication unit, a private message from the prescribed counterpart terminal intended for the mobile terminal and not the other counterpart terminals in the group chat window; and
displaying the received private message on the touchscreen received from the prescribed counterpart terminal in the group chat window.

13. The method of claim 12, further comprising:
displaying a voice indicator with the received private message indicating the received private message was input by voice from a user of the prescribed counterpart terminal.

14. The method of claim 9, further comprising:
displaying a text input window for inputting the message with the group chat window;
receiving a touch input of a prescribed transceived message included in the history of messages and a drag input to the text input window; and
displaying a graphic object indicating the prescribed counterpart terminal corresponding to the touched prescribed transceived message.

15. The method of claim 14, further comprising:
identifiably displaying the prescribed transceived message.

16. The method of claim 9, further comprising:
receiving a touch and scroll input of a prescribed transceived message included in the history of messages; and
displaying only messages related to the touched prescribed transceived message in a group as being overlaid on the messages transceived with the plurality of counterpart terminals.

* * * * *